3,313,813
Patented Apr. 11, 1967

3,313,813
(3-AMINO-5,6-DISUBSTITUTED-PYRAZINOYL) GUANIDINES
Edward J. Cragoe, Jr., Lansdale, Pa., assignor to Merck & Co., Inc., Rahway, N.J., a corporation of New Jersey
No Drawing. Filed Oct. 7, 1963, Ser. No. 313,315
31 Claims. (Cl. 260—250)

This application is a continuation-in-part of United States application, Ser. No. 234,230 filed Oct. 30, 1962, now abandoned.

This invention particularly is concerned with (3-amino-5,6-disubstituted-pyrazinoyl)guanidine compounds which can be represented by the following structure:

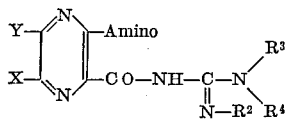

and pharmaceutically acceptable salts thereof, especially the hydrochloride salts, wherein X represents hydrogen, a halogen or halogen-like radical, such as, chloro, bromo, iodo or trifluoromethyl, or a lower-alkyl; lower-cycloalkyl, mononuclear aryl, either unsubstituted or substituted, advantageously with a halogen especially a chloro or bromo substituent, anilino, Z-thio or Z-sulfonyl wherein Z is lower alkyl or phenyl-lower alkyl;

Y represents hydrogen, hydroxyl or mercapto, lower alkoxy or lower alkyl-thio, halogen, especially chlorine, lower-alkyl, lower-cycloalkyl, mononuclear aryl, especially phenyl or amino, advantageously having the structure

wherein R and $R^1$ can be similar or dissimilar radicals and respectively represent hydrogen, amino or mono- or di-lower-alkylamino, (advantageously forming a hydrazino group at the 5-position carbon), lower alkoxy, Y represents substituted amino, —$NRR^1$, where R and $R^1$ represent lower alkyl either straight or branched chain or cyclic (3- to 6-membered rings) and either unsubstituted or containing one or more substituents such as hydroxyl, halogen (chlorine, bromine, fluorine and the like), a cycloalkyl substituent having 3 to 6 carbons in the cycloalkyl structure, an aryl substituent preferably phenyl or substituted phenyl such as lower-alkyl-phenyl and halophenyl as chlorophenyl, bromophenyl, fluorophenyl, and the like, or a heterocyclic substituent especially furyl, pyridyl, and $(CH_2)_nN$— wherein $n$ is one of the numerals 4 through 6, or an amino substituent as the unsubstituted amino, or mono- or di-lower-alkyl amino, and when R and $R^1$ each represents a lower alkyl, the lower alkyl groups can be linked together to form a cyclic structure with the nitrogen atom to which they are attached, particularly a 5- to 8-membered ring, advantageously forming with the nitrogen atom a 1-pyrrolidinyl, piperidino, hexahydro-1-azepinyl, or octahydro-1- azocinyl radical and the like, Y represents substituted amino, —$NRR^1$, where R and $R^1$ represent lower alkenyl, aryl, advantageously an unsubstituted or substituted phenyl, wherein the substituent(s) are preferably halogen (chlorine, bromine, fluorine) or lower alkyl (methyl, ethyl, propyl, isopropyl) and the like, amidino or substituted amidino, especially an N,N-di-lower alkyl-imidino, such as N,N-dimethylamidino;

X and Y, in addition, can be linked together to form a 4-membered carbon chain that can be either unsaturated or saturated and that can be unsubstituted or substituted, and if substituted the substituent advantageously is a halogen, especially a chloro-atom.

$R^2$ represents hydrogen and lower alkyl;

$R^3$ represents hydrogen, lower alkyl, either saturated or unsaturated and substituted or unsubstituted, the substituent group(s) preferably being hydroxyl, aryl, either mono- or di-nuclear aryl, as phenyl or naphthyl, and either unsubstituted or containing one or more substituents, especially selected from lower alkyl, definition of substituents, continued substituents on aryl moiety of aryl-alkyl group halogen, lower alkyl, lower alkoxy, or any combination of these substituent groups, mono- or di-lower-alkylamino, wherein the alkyl groups may be linked to form a hetero structure with the aminonitrogen to which they are attached such as to form an azacycloalkyl group, heterocyclic, and especially the pyridyl group, halogen, aryl or substituted aryl, the substituent group(s) preferably being halogen, and lower alkyl, heterocyclic, advantageously a pyridyl radical, alkylideneamino, and acyl;

$R^4$ represents hydrogen, lower alkyl, either saturated or unsaturated and substituted or unsubstituted as described above for $R^3$; or $R^3$ and $R^4$ can be lower alkyl groups linked directly together or through a hetero atom, especially through oxygen or nitrogen to produce a 5 to 8 membered cyclic structure, thus forming with the nitrogen atom to which they are attached a 1-pyrrolidinyl, piperidino, 1-piperazinyl, especially a 4-lower alkyl-1-piperazinyl or morpholino, and the like radicals;

and when $R^2$ and $R^3$ (or $R^4$) each represents a lower alkyl, they can be linked together to form a cyclic structure with the nitrogen atoms to which they are attached, particularly to form a 2-(2-imidazolinyl) radical.

The 3-position amino group can be an unsubstituted amino as well as mono- or di-substituted amino groups, the substituent(s) advantageously being lower alkyl and lower alkanoyl and also where the substituents are linked to form a heterocyclic structure with the amino nitrogen to which they are attached.

The compounds of this invention are useful because they possess diuretic and natriuretic properties. They differ from most of the known, effective diuretic agents, however, in that the compounds of this invention selectively enhance the excretion of sodium ions without causing an increase in excretion of potassium ions. The potassium loss, which is caused by known diuretics, often results in a severe muscular weakness. Since the compounds of this invention are essentially free of this potassium depletion, they have this decided advantage as diuretics. As diuretic agents, they can be used for the treatment of edema, hypertension and other diseases known to be responsive to this therapy.

It has also been found as another feature of this invention that when co-administered with other diuretic agents known to enhance the elimination of potassium ions along with sodium ions, the novel pyrazinoylguanidines of this invention will reduce the excretion of potassium ions and thus overcome this undesirable property of other diuretic agents. The compounds of this invention, therefore, are useful in combination with other classes of diuretic agents to prevent the loss of potassium which the other diuretics otherwise would cause to be eliminated. In addition, the compounds of this invention are useful by themselves as diuretic and/or saluretic agents.

In some instances it may be desirable to make a salt of these compounds, using a pharmaceutically acceptable acid, and these salts are to be considered as included in this invention and in the scope of the claims.

The products of this invention can be administered to man or animals in the form of pills, tablets, capsules, elixirs, injectable preparations and the like and can comprise one or more of the compounds of this invention as the only essential active ingredient of the pharmaceutical formulation or, as mentioned above, the novel compound(s) can be combined in pharmaceutical formulations with other diuretic agents or, indeed, other therapeutic agents.

The compounds of this invention are advantageously administered at a dosage range of from about 5 mg./day to about 750 mg./day or at a somewhat higher or lower dosage at the physician's discretion, preferably in subdivided amounts on a 2 to 4 times a day regimen.

The compounds of this invention can be made by several different processes one of which may be more useful than another for making a specific compound. In the description of the processes that follow, the radicals X, Y, $R^2$, $R^3$ and $R^4$ are as above defined.

One generally useful process can be represented as follows:

vents. The reaction may be carried out at room temperature or by heating on a steam bath for 1 minute to 2 hours or longer. The desired product usually is recovered from the cooled reaction mixture by trituration with water. Purification frequently is carried out by converting the product to a salt which can be recrystallized or the base can be regenerated by addition of aqueous alkali.

A second method for preparing especially the 3,5-diamino compounds of this invention may be represented as follows:

METHOD B

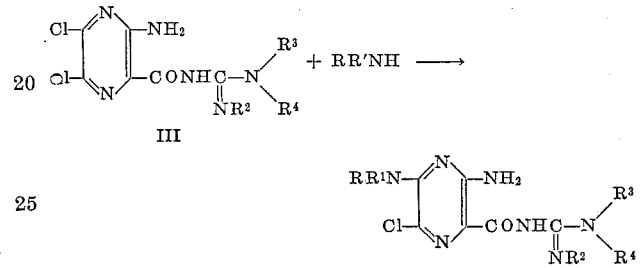

Method B process involves the reaction of a (3-amino-5,6-dichloropyrazinoyl)guanidine of the type illustrated by Compound III with an amine of the structure $RR^1NH$. The reaction usually is carried out in a solvent, such as dimethylformamide, secondary alcohols, tertiary alcohols or dimethyl sulfoxide. The desired product may be isolated and purified as described for Method A.

A third method for preparing compounds of this invention specifically concerns those compounds in which R represents hydrogen and $R^1$ represents amidino or substituted amidino. Compounds of this type can be prepared advantageously by Method C, which is illustrated as follows:

METHOD A

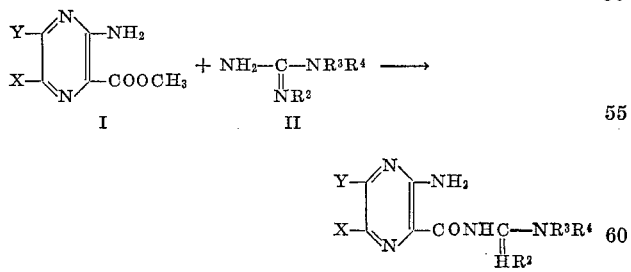

METHOD C

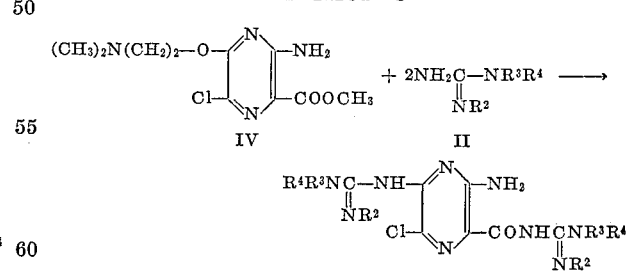

Method A synthesis involves the reaction of a pyrazinoic acid ester of the type illustrated by Compound I with a guanidine of the type illustrated by Compound II. The methyl ester is shown for illustrative purposes only since the ester may be that of certain other alcohols, especially lower aliphatic alcohols. It will be noted that this alkoxy (ester) radical does not appear in the desired end product.

Synthesis by Method A is preferably carried out under anhydrous conditions either with or without a solvent such as methanol, ethanol, isopropyl alcohol or other sol- Method C process involves the reaction of methyl 3-amino-5-(2-dimethylaminoethoxy)-6-chloropyrazinoate (IV) with a guanidine of the type illustrated by Compound II. Compound IV was used for illustrative purposes only since certain other lower aliphatic 3-amino-5-substituted-alkoxy (or aryloxy)-6-halopyrazinoates can be used. It will be noted that neither the methoxy nor the 5-(2-dimethylaminoethoxy) group appear in the final product.

Compound IV can be prepared by the reaction of Compound V with 2-dimethylaminoethanol as illustrated below:

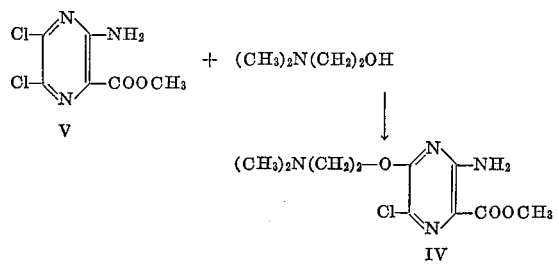

Other alkyl 3-amino-5-substituted-alkoxy (or aryloxy)-6-halopyrazinoates can be prepared by an analogous process, wherein a salt of the alcohol or phenol reactant is used.

A fourth method which is useful in preparing the compounds of this invention including having an acyl substituent attached to the 3-amino group, can be illustrated as follows:

METHOD D

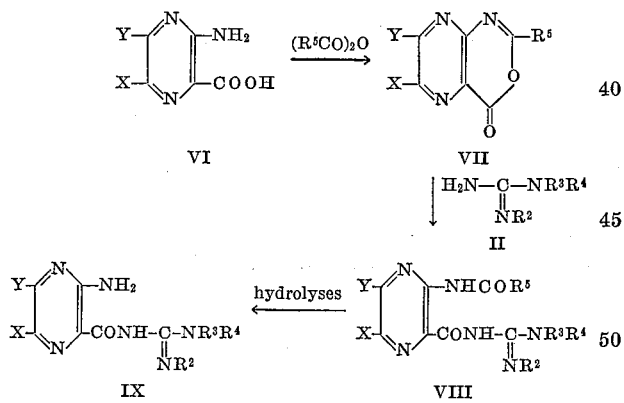

When Compound VI is heated with a lower alkanoic acid anhydride ($R^5CO-O-CO-R^5$) a 2-alkyl-4H-pyrazino-[2,3d][1,3]oxazin-4-one (Compound VII) is obtained. To obtain the Compound VII in which $R^5$ equals hydrogen, Compound VI is heated with a mixture of formic acid and acetic anhydride. Compound VII then is dissolved in a solvent such as ethyl acetate, for example, and is heated in an atmosphere of nitrogen with the guanidine (Compound II) to produce Compound VIII. Compound VIII will be recognized as one of the compounds of the invention having an acyl radical attached to the amino group in the 3-position of the nucleus. This acyl group can be removed readily by hydrolysis to form Compound IX.

The intermediate 3-aminopyrazinoic acid esters, in most instances, are novel compounds. The esters are prepared by a number of different methods which are illustrated below. Some of the esters can be prepared by any one of several of the methods described; with others certain methods are preferable and with a few esters one particular method is specific for their synthesis.

Certain of the methods are especially suited to the preparation of esters having specific substituents attached to the 5- and/or 6-positions of the pyrazine nucleus. As the details concerning the actual reaction conditions are provided in the examples, the reaction scheme for each of the preferred procedures is provided without discussion. Each step, however, is carried out by a well known procedure unless critical conditions are noted.

*Method I.—Via a Lumazine*

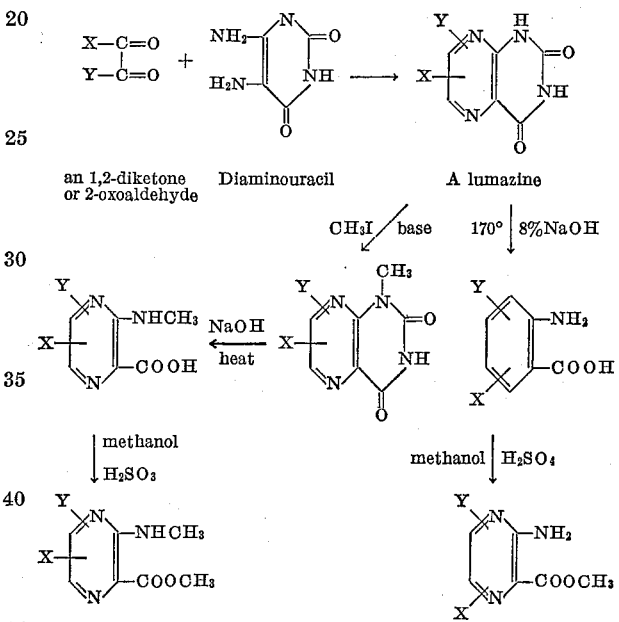

*Method II.—Via Aminomalonamidamidine*

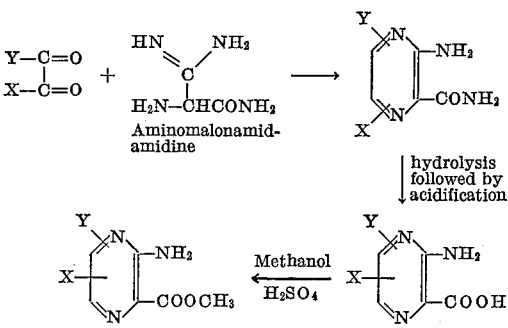

*Method III.—Via halogenation*

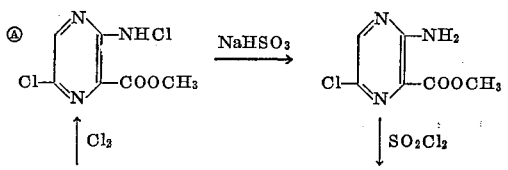

*Method III.—Via halogenation—Continued*

*Method V.—Displacement of a 5-methylsulfinyl radical*

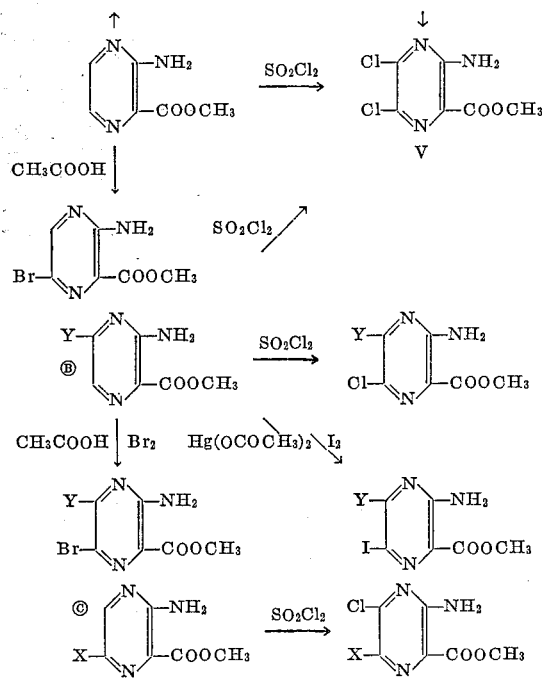
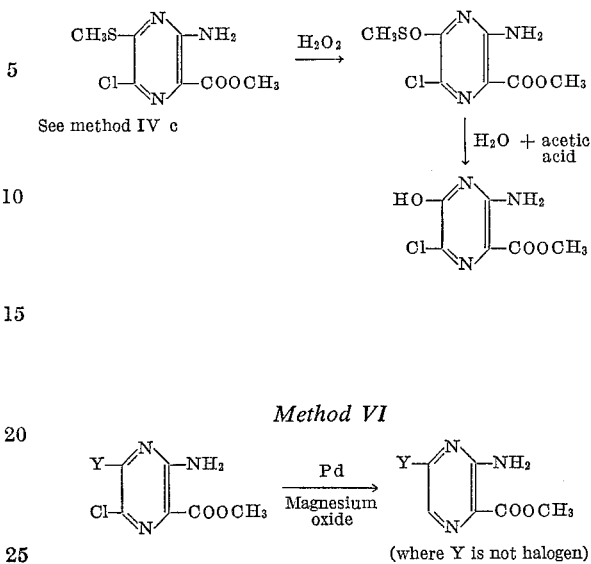

See method IV c

*Method IV.—Via displacement of 5-halogen* a
b
c

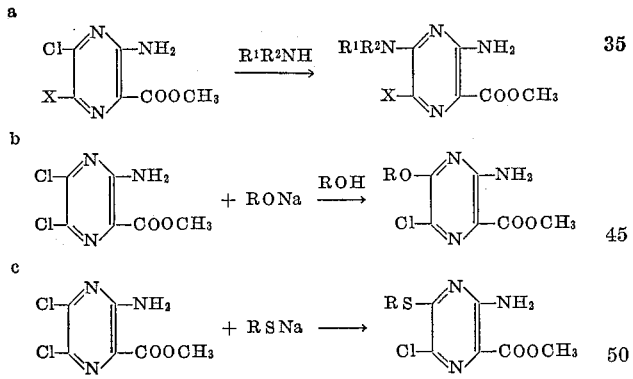

*Method VI*

(where Y is not halogen)

The intermediate pyrazinoic acids required in the synthesis of the 4 - H - pyrazino[2,3-d][1,3]oxazin-4-ones (VII) which are used in Method D are prepared as follows:

*Method 1.—Hydrolysis of the esters (described elsewhere)*

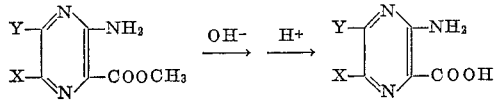

*Method 2.—Special method for 6-RS and 6-RSO$_2$ compounds*

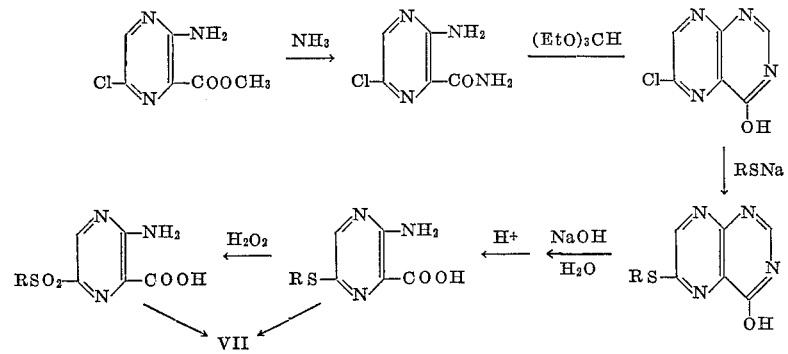

d

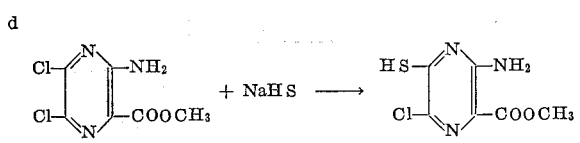

The following examples are illustrative of the methods by which the products of this invention can be prepared and are not to be considered as limiting the invention to the particular procedural conditions employed or to the particular compounds prepared thereby. All melting points are corrected values.

EXAMPLE 1

Methyl 3,5-diamino-6-chloropyrazinoate

*Step A: Preparation of methyl 3-amino-5,6-dichloropyrazinoate.*—Methyl 3 - aminopyrazinoate (765 g., 5 moles) is suspended in 5 liters of dry benzene. While stirring under anhydrous conditions sulfuryl chloride (1.99 liters, 3318 g., 24.58 moles) is added over a period of 30 minutes and stirring is continued for 1 hour. During this period, the temperature rises to about 50° C. and then begins to drop. The mixture is heated cautiously to reflux (60° C.), refluxed for for 5 hours and then stirred over night at room temperature. The excess sulfuryl chloride is distilled off at atmospheric pressure (distillation is stopped when vapor temperature reaches 78° C.). The dark red mixture is chilled to 6° C. The crystals are filtered off, washed by displacement with two 100 ml. portions of cold (8° C.) benzene, then washed with 300 ml. petroleum ether and dried in vacuo at room temperature, yielding 888 g. (80%) of methyl 3-amino-5,6-dichloropyrazinoate in the form of red crystals, M.P. 228–230° C. The crude product is dissolved in 56 liters of boiling acetonitrile and passed through a heated (70–80° C.) column of decolorizing charcoal (444 g.). The column is washed with 25 liters of hot acetonitrile, the combined eluate concentrated in vacuo to about 6 liters and chilled to 5° C. The crystals that form are filtered, washed three times with cold acetonitrile, and air dried to constant weight, yielding 724 g. (82% recovery, 66% overall) of methyl 3-amino-5,6-dichloropyrazinoate in the form of yellow crystals, M.P. 230–234° C. After additional recrystallizations from acetonitrile the product melts at 233–234° C.

*Analysis.*—Calculated for $C_6H_5Cl_2N_3O_2$: C, 32.46; H, 2.27; N, 18.93; Cl, 31.94. Found: C, 32.83; H, 2.35; N, 19.12; Cl, 31.94.

*Step B: Preparation of methyl 3,5-diamino-6-chloropyrazinoate.*—In a 2-liter, 3-necked flask fitted with a mechanical stirrer, thermometer and gas inlet tube is placed dry dimethyl sulfoxide (1 liter). Methyl 3-amino-5,6-dichloropyrazinoate (100 g., 0.45 mole) is added and the mixture stirred and heated at 65° C. on a steam bath until solution is effected. A stream of dry ammonia gas is admitted to the the solution, with continuous stirring, over a period of 45 minutes while the temperature is maintained at 65–70° C. The solution is cooled to about 10° C. with continuous stirring and ammonia gas is admitted for an additional 1¼ hours. The yellow reaction mixture is poured, with stirring, into cold water (2 liters) and the light yellow solid that separates is removed by filtration, thoroughly washed with water, and dried in a vacuum desiccator to give 82.5 g. (91%) of methyl 3,5 - diamino - 6 - chloropyrazinoate, M.P. 210–212° C. Recrystallization from acetonitrile gives material melting at 212–213° C.

*Analysis.*—Calculated for $C_6H_7ClN_4O_2$: C, 35.57; H, 3.48; N, 27.65. Found: C, 35.80; H, 3.38; N, 28.01.

EXAMPLE 2

Methyl 3,5-diamino-6-bromopyrazinoate

*Step A: Preparation of methyl 3,5-diaminopyrazinoate.*—A mixture of methyl 3,5-diamino-6-chloropyrazinoate, from Example 1, (14.2 g., 0.07 mole), 5% palladium on charcoal catalyst (9 g.) magnesium oxide (4.0 g., 0.1 mole) and methanol (250 ml.) is shaken with hydrogen for 18 hours at room temperature and at an initial hydrogen pressure of 30 p.s.i. The pressure drop indicates that 0.07 mole of hydrogen has been adsorbed. The mixture is filtered, and the solids extracted with a boiling solution of 2-propanol (500 ml.) and water (250 ml.). The methanol filtrate and the extract solution are combined and concentrated to a volume of 100 ml. The methyl 3,5-diaminopyrazinoate which precipitates weighs 10.0 g. (85%), M.P. 247–250° C. (dec.). Recrystallization from aqueous 2-propanol gives material which melts at 252–254° C. (dec.).

*Analysis.*—Calculated for $C_6H_8N_4O_2$: C, 42.85; H, 4.80; N, 33.32. Found: C, 43.15; H, 4.76; N, 33.11.

*Step B: Preparation of methyl 3,5-diamino-6-bromopyrazinoate.*—A solution of bromine (2.1 g., 0.013 mole) in acetic acid (10 ml.) is added to a suspension of methyl 3,5-diaminopyrazinoate (2.0 g., 0.012 mole) in acetic acid (25 ml.) at 50° C. After standing 10 minutes, the crystalline product is collected and recrystallized from 2-propanol to give 1.2 g. of methyl 3,5-diamino-6-bromopyrazinoate, M.P. 217–219° C.

*Analysis.*—Calculated for $C_6H_7BrN_4O_2$: C, 29.17; H, 2.86; N, 22.68. Found: C, 29.51; H, 3.02; N, 22.56.

EXAMPLE 3

Methyl 3,5-diamino-6-iodopyrazinoate

A suspension of methyl 3,5-diaminopyrazinoate, from Example 2, Step A, (1.7 g., 0.01 mole) in water (30 ml.) is heated to 70° C., and mercuric acetate (3.2 g., 0.01 mole) and a solution of iodine (2.5 g., 0.01 mole) in warm dioxane (20 ml.) are quickly added. The mixture is stirred and heated for 5 minutes on the steam bath, then allowed to cool to room temperature and then a 15% aqueous solution of potassium iodide (50 ml.) is added thereto. The red solution thus obtained quickly deposits the crystalline product which is collected and recrystallized from a 2-propanol-dimethylformamide mixture to yield 1.2 g. of methyl 3,5-diamino-6-iodopyrazinoate, M.P. 200–202° C.

*Analysis.*—Calculated for $C_6H_7IN_4O_2$: C, 24.50; H, 2.40; N, 19.05. Found: C, 24.91; H, 2.73; N, 18.73.

EXAMPLE 4

Methyl 3-amino-5-anilino-6-chloropyrazinoate

A one liter, round-bottom, one-necked flask, fitted with a water-cooled condenser, calcium chloride drying tube and a magnetic stirrer is charged with methyl 3-amino-5,6-dichloro-pyrazinoate from Example 1, Step A, (11.1 g., 0.05 mole), 2-propanol (500 ml.), aniline (14.4 g., 0.155 mole) and aniline hydrochloride (12.8 g., 0.10 mole). The reaction mixture is stirred and heated on a steam bath at reflux for 24 hours, filtered and cooled to yield 10.0 g., (71%) methyl 3-amino-5-anilino-6-chloropyrazinoate which, after recrystallization from 2-propanol melts at 171.5–173° C.

*Analysis.*—Calculated for $C_{12}H_{11}ClN_4O_2$: C, 51.71; H, 3.98; N, 20.10. Found C, 51.33; H, 4.12; N, 20.30.

EXAMPLE 5

Methyl 3-amino-5-(p-chloroanilino)-6-chloropyrazinoate

A flask of the type described in Example 4 is charged with methyl 3-amino-5,6-dichloropyrazinoate (11.1 g., 0.05 mole) (from Example 1, Step A), p-chloroaniline (19.7 g., 0.155 mole), p-chloroaniline hydrochloride (17.9 g., 0.11 mole) and 2-propanol (500 ml.). The reaction and isolation is substantially the same as described in Example 4, yielding 13.9 g. (89%) of methyl 3-amino-5-(p-chloroanilino)-6-chloropyrazinoate. After recrystallization from acetonitrile the M.P. is 207–208° C.

*Analysis.*—Calculated for $C_{12}H_{10}N_4O_2Cl_2$: C, 46.02; H, 3.22; N, 17.89. Found: C, 45.96; H, 3.10; N, 17.86.

EXAMPLE 6

Methyl 3-amino-5-dimethylamino-6-chloropyrazinoate

In a 5 liter, 3-necked flask equipped with a mechanical stirrer and reflux condenser protected with a drying tube is placed methyl 3-amino-5,6-dichloropyrazinoate (178 g., 0.8 mole) (from Example 1, Step A) and 2-propanol (1.1 liters). While stirring, the suspension is treated with dimethylamine (200 g., 4.44 mole) in 2-propanol (2 liters) and the mixture then is refluxed for one hour. The solution is cooled in an ice bath and the crystalline produce that separates is removed by filtration and dried. The yield of methyl 3-amino-5-dimethylamino-6-chloropyrazinoate is 177.2 g. (97%), M.P. 145–146.5° C. Recrystallization from methanol gives material melting at 145.5–146.5° C.

Analysis.—Calculated for $C_8H_{11}ClN_4O_2$: C, 41.66; H, 4.81; N, 24.29. Found: C, 41.73; H, 4.52; N, 24.24.

EXAMPLE 7

Methyl 3-amino-5-hydroxypyrazinoate

Step A: Preparation of methyl 3-amino-5-methyl-mercapto-6-chloropyrazinoate.—A solution of methyl mercaptan (10 g., 0.18 mole) in 20% aqueous sodium hydroxide (17 ml.) and methanol (100 ml.) is added during ten minutes to a boiling mixture of methyl 3-amino-5,6-dichloropyrazinoate (17.7 g., 0.08 mole) and methanol (1 liter). The mixture is refluxed an additional 15 minutes, cooled, and the solid collected and recrystallized from methanol to obtain 12 g. of methyl 3-amino-5-methylmercapto-6-chloropyrazinoate, M.P. 212–216° C. After further recrystallization from methanol, the product melts at 214–216° C.

Analysis.—Calculated for $C_7H_8ClN_3O_2S$: C, 35.98; H, 3.45; N, 17.98. Found: C, 36.24; H, 3.33; N, 17.91.

Step B: Preparation of methyl 3-amino-5-methyl sulfinyl-6-chloropyrazinoate.—A mixture of methyl 3-amino-methylsulfinyl-6-chloropyrazinoate (7.5 g., 0.03 mole) 30% aqueous solution of hydrogen peroxide (35 ml.), and acetic acid (300 ml.) is stirred 18 hours at room temperature. The solid product is collected and weighs 18.5 g., M.P. 235–239° C. (dec.). It is satisfactory for synthetic use. A small sample recrystallized from a mixture of methanol, ethyl acetate and dimethylformamide melts at 237.5–240.5° C. (dec.).

Analysis.—Calculated for $C_7H_8ClN_3O_3S$: C, 33.67; H, 3.23; N, 16.83. Found: C, 33.79; H, 3.15; N, 16.72.

Step C: Preparation of methyl 3-amino-5-hydroxy-6-chloropyrazinoate.—A mixture of methyl 3-amino-5-methylsulfiinyl-6-chloropyrazinoate (7.5 g., 0.03 mole) acetic acid (75 ml.) and water (12 ml.) is heated 3 hours on the steam bath. The product gradually crystallizes from the initially clear solution. It is collected and recrystallized from methanol-dimethylformamide to give 3.7 g. (61%) of methyl 3-amino-5-hydroxy-6-chloropyrazinoate which decomposes at about 245° C.

Analysis.—Calculated for $C_6H_6ClN_3O_3$: C, 35.39; H, 2.98; N, 20.69. Found: C, 35.69; H, 2.83; N, 20.57.

Step D: Preparation of methyl 3-amino-5-hydroxypyrazinoate.—This compound is prepared by essentially the same method described in Example 2, Step A, except that the methyl 3,5-diamino-6-chloropyrazinoate of Example 2, Step A is replaced by an equimolecular quantity of methyl 3-amino-5-hydroxy-6-chloropyrazinoate. The product methyl 3-amino-5-hydroxypyrazinoate decomposes from 220 to 260° C.

Analysis.—Calculated for $C_6H_7N_3O_3$: C, 42.60; H, 4.17; N, 24.85. Found: C, 42.79; H, 4.29; N, 24.88.

EXAMPLE 8

Methyl 3,5-diaminopyrazinoate

A mixture of methyl 3,5-diamino-6-chloropyrozinoate (14.2 g., 0.07 mole) from Example 1, Step B, a 5% palladium on charcoal catalyst (9 g.), magnesium oxide (4.0 g., 0.1 mole) and methanol 250 ml. is shaken with hydrogen for 18 hours at room temperature and at an initial hydrogen pressure of 30 p.s.i. The pressure drop indicates an absorption of 0.07 mole of hydrogen. The mixture is filtered, and the solids extracted with a boiling solution of 500 ml. of 2-propanol and 250 ml. of water. The methanol filtrate and the extract solution are combined and concentrated to a volume of 100 ml. The methyl 3,5-diaminopyrazinoate which precipitates weighs 10.0 g. (85%), M.P. 247–250° C. (dec.). A further recrystallization raises the M.P. to 252–254° C. (dec.).

Analysis.—Calculated for $C_6H_8N_4O_2$: C, 42.85; H, 4.80; N, 33.32. Found: C, 43.15; H, 4.76; N, 33.11.

EXAMPLE 9

Methyl 3-amino-5-dimethylaminopyrazinoate

This compound is prepared by essentially the same method described in Example 8, except that the methyl 3,5-diamino-6-chloropyrazinoate is replaced by an equimolecular quantity of methyl 3-amino-5-dimethylamino-6-chloropyrazinoate (from Example 6).

The product melts at 242.5–243.5° C.

Analysis.—Calculated for $C_8H_{12}N_4O_2$: C, 48.97; H, 6.17; N, 28.56. Found: C, 49.05; H, 5.91; N, 28.62.

EXAMPLE 10

Methyl 3-amino-5-methoxypyrazinoate

This compound is prepared by essentially the same method described in Example 8 except that the methyl 3,5-diamino-6-chloropyrazinoate of Example 2, Step A is replaced by an equimolecular quantity of methyl 3-amino-5-methoxy-6-chloropyrazinoate (from Example 12). The product melts at 205.5–207.5° C.

Analysis.—Calculated for $C_7H_9N_3O_3$: C, 45.90; H, 4.95; N, 22.94. Found: C, 45.32; H, 4.78; N, 22.79.

EXAMPLE 11

Methyl 3-amino-5-benzylaminopyrazinoate

Step A: Preparation of methyl 3-amino-5-benzylamino-6-chloropyrazinoate.—A mixture of methyl 3-amino-5,6-dichloropyrazinoate (8.9 g., 0.04 mole) and benzylamine (20 ml.) is heated 30 seconds on the steam bath. The ester dissolves and the product precipitates and is recrystallized from methanol to give 7.5 g. (64%) of methyl 3-amino-5-benzylamino-6-chloropyrazinoate, M.P. 157–158° C.

Analysis.—Calculated for $C_{13}H_{13}ClN_4O_2$: C, 53.34; H, 4.48; N, 19.14. Found: C, 53.46; H, 4.46; N, 19.22.

Step B: Preparation of methyl 3-amino-5-benzylaminopyrazinoate.—This compound is prepared by essentially the same method described in Example 8 except that the methyl 3,5-diamino-6-chloropyrazinoate of Example 2, Step A, is replaced by an equimolecular quantity of methyl 3-amino-5-benzylamino-6-chloropyrazinoate. The product melts at 189.5–191.5° C.

Analysis.—Calculated for $C_{13}H_{14}N_4O_2$: C, 60.45; H, 5.46; N, 21.70. Found: C, 60.61; H, 5.72; N, 21.62.

EXAMPLE 12

Methyl 3-amino-5-methoxy-6-chloropyrazinoate

Methyl 3-amino-5,6-dichloropyrazinoate (1.1 g., 0.005 mole) is dissolved in 200 ml. of boiling anhydrous methanol and treated with a solution of sodium methoxide prepared from metallic sodium (115 mg. 0.005 g. atoms) in anhydrous methanol (20 ml.). The product which separates on cooling, is filtered, rinsed with water and methanol and dried to give 1.0 g. (92%) of methyl 3-amino-5-methoxy-6-chloropyrazinoate which when recrystallized from acetonitrile melts at 255–257° C.

Analysis.—Calculated for $C_7H_8ClN_3O_3$: C, 38.63; H, 3.71; N, 19.31. Found: C, 39.00; H, 3.82; N, 18.76.

EXAMPLE 13

Methyl 3-amino-5-methylmercapto-6-chloropyrazinoate

A 1 liter, round-bottom flask equipped with a stirrer, condenser and dropping funnel is charged with methyl 3-amino-5,6-dichloropyrozinoate (from Example 1A) (4.44 g., 0.02 mole) and anhydrous methanol (700 ml.). A solution of sodium methylmercaptide, prepared from methyl mercaptan (1.92 g., 0.04 mole), in methanol (30 ml.) and 20% aqueous sodium hydroxide (4.2 ml., 0.021 mole), is added to the solution containing the ester over a ten minute period. The solution is refluxed for 15 minutes and cooled and the product that separates is removed by filtration and recrystallized from methanol, yielding 3.3 g. (71%) of methyl 3-amino-5-methylmercapto-6-chloropyrazinoate, M.P. 212–214° C.

*Analysis.*—Calculated for $C_7H_8ClN_3O_2S$: C, 35.98; H, 3.45; N, 17.98. Found: C, 36.24; H, 3.33; N, 17.91.

EXAMPLE 14

*Methyl 3-amino-5-mercapto-6-chloropyrazinoate*

A 200 ml. flask is charged with sodium sulfide nonahydrate (9.6 g., 0.04 mole), sulfur (10 g.) and absolute ethanol (80 ml.), heated for ½ hour at reflux and cooled to 25° C. The solution is treated with methyl 3-amino-5,6-dichloropyrazinoate, from Example 1, Step A (8.9 g., 0.04 mole). Stirred at 25° C. for one hour, filtered and acidified with acetic acid. The solid material is removed by filtration and dried, yielding 7.8 g. (89%) of product. After purification by dissolving in dilute sodium hydroxide and precipitating with acetic acid, methyl 3-amino-5-mercapto-6-chloropyrazinoate, melts at 207–208° C. (dec.).

*Analysis.*—Calculated for $C_6H_6ClN_3O_2S$: C, 32.81; H, 2.75; N, 19.13. Found: C, 32.31; H, 2.90; N, 19.13.

EXAMPLE 15

*Ethyl 3-amino-5-ethoxy-6-chloropyrazinoate*

A 1 liter, round-bottomed flask fitted with a stirrer, condenser and dropping funnel is charged with methyl 3-amino-5,6-dichloropyrazinoate, from Example 1, Step A, (4.44 g., 0.02 mole) and absolute ethanol (300 ml.). The solution is heated to reflux over a fifteen minute period.

The solid product is removed by filtration and recrystallized from isopropyl alcohol to give 3.1 g. (64%) of ethyl 3-amino-5-ethoxy-6-chloropyrazinoate, M.P. 123–125° C.

*Analysis.*—Calculated for $C_9H_{12}ClN_3O_3$: C, 44.00; H, 4.92; N, 17.11. Found: C, 44.11; H, 4.69; N, 17.28.

EXAMPLE 16

*Methyl 3-amino-6-methylpyrazinoate*

A mixture of 3-amino-6-methylpyrazinamide (31 g., 0.20 mole) and 10% sodium hydroxide solution (320 ml.) is stirred and heated on a steam bath for 30 minutes whereupon a clear solution is obtained. The solution is chilled and the sodium salt of 3-amino-6-methylpyrazinoic acid which precipitates is collected and air dried yielding 25 g. of the salt. A mixture of the sodium salt of 3-amino-6-methyl pyrazinoic acid (97 g., 0.55 mole) dimethyl sulfate (77 g., 0.61 mole) and methanol (700 ml.) is stirred 19 hours at room temperature. A small amount of suspended solid is removed by filtration, and the filtrate evaporated to dryness in vacuo. The residue is stirred with a saturated sodium bicarbonate solution (200 ml.) and the insoluble product is collected, washed with water and dried, yielding 18 g. of methyl 3-amino-6-methylpyrazinoate, M.P. 138–140° C. which after recrystallization from benzene melts at 138.5–140.5° C.

*Analysis.*—Calculated for $C_7H_9N_3O_2$: C, 50.29; H, 5.43; N, 25.14. Found: C, 50.45; H, 5.49; N, 25.02.

EXAMPLE 17

*Methyl 3-amino-5-dimethylamino-6-methylpyrazinoate*

*Step A: Preparation of methyl 3-amino-5-chloro-6-methylpyrazinoate.*—A mixture of methyl 3-amino-6-methylpyrazinoate, from Example 16 (9.2 g., 0.053 mole) and sulfuryl chloride (65 ml.) is stirred 30 minutes in a flask surrounded by a cold water bath. A vigorous reaction occurs during which a yellow solid product is formed. The solid is removed by filtration and recrystallized from ethyl acetate yielding 4.4 g. of methyl 3-amino-5-dichloroamino-6-methylpyrazinoate, M.P. 176.5–179.5° C.

*Analysis.*—Calculated for $C_7H_8ClN_3O_2$: C, 41.70; H, 4.00; N, 20.84. Found: C, 41.59; H, 4.15; N, 20.86.

*Step B: Preparation of methyl 3-amino-5-dimethylamino-6-methylpyrazinoate.*—A solution of methyl 3-amino-5-chloro-6-methylpyrazinoate (3.3 g., 0.0164 mole) and dimethylamine (6 g.) in 2-propanol (25 ml.) is allowed to stand one hour at room temperature, and then evaporated in vacuo. The residue is recrystallized from a mixture of benzene and cyclohexane, yielding 2.9 g. of methyl 3 - amino-5-dimethylamino-6-methylpyrazinoate, M.P. 108.5–110.5 C.

*Analysis.*—Calculated for $C_9H_{14}N_4O_2$: N, 26.65. Found: N, 26.70.

EXAMPLE 18

*Methyl 3-amino-5-methylpyrazinoate*

A mixture of 3-amino-5-methylpyrazinoic acid (30 g., 0.20 mole) and a 30% solution of hydrogen chloride in methanol (650 ml.) is stirred at room temperature for 42 hours. The resulting solution then is evaporated to dryness in vacuo. The solid residue is stirred with sodium bicarbonate solution and the insoluble product collected. The crude product is recrystallized twice from water to yield 15.4 g. of methyl 3-amino-5-methylpyrazinoate, M.P. 163–167° C. A further recrystallization from water increases the melting point to 165–167° C.

*Analysis.*—Calculated for $C_7H_9N_3O_2$: C, 50.29; H, 5.43; N, 25.14. Found: C, 50.05; H, 5.35; N, 24.88.

EXAMPLE 19

*Methyl 3-amino-6-bromo-5-methylpyrazinoate*

A solution of bromine (4.18 g., 0.026 mole) in acetic acid (3 ml.) is added during 20 minutes to a solution of methyl 3-amino-5-methylpyrazinoate, from Example 18, (4.2 g., 0.025 mole) in acetic acid (15 ml.). The mixture is poured into water (150 ml.) and the solid product which precipitates is recrystallized twice from acetic acid to yield 3.6 g. of methyl 3-amino-6-bromo-5-methylpyrazinoate, M.P. 179–181° C.

*Analysis.*—Calculated for $C_7H_8BrN_3O_2$: C, 34.16; H, 3.28; N, 17.08. Found: C, 34.42; H, 3.26; N, 17.00.

EXAMPLE 20

*Methyl 3-amino-6-ethylpyrazinoate*

*Step A: Preparation of 3 - amino - 6 - ethylpyrazinamide.*—Aminomalonamidamidine dihydrochloride (52.5 g., 0.28 mole) is added to an ice-cold solution of ethylglyoxal (28.8 g., 0.335 mole) in water (450 ml.). Concentrated ammonium hydroxide solution (about 65 ml.) is added to make the solution basic. The solution is allowed to stand at room temperature 20 hours and the precipitated product that forms is collected by filtration and recrystallized from 2-propanol yielding 17.5 g. of 3-amino-6-ethylpyrazinamide, M.P. 160–167° C. An additional recrystallization from 2 propanol increases the melting point to 165.5–168.5° C.

*Analysis.*—Calculated for $C_7H_{10}N_4O$: N, 33.72. Found: N 33.83.

*Step B: Preparation of 3-amino-6-ethylpyrazinoic acid.*—A mixture of 3-amino-6-ethylpyrazinamide (24.4 g., 0.147 mole) and 10% sodium hydroxide solution (200 ml.) is stirred and heated on a steam bath for 30 minutes. When the resulting solution is chilled, the sodium salt of the product acid precipitates. The salt is collected, dissolved in hot water, and the solution acidified with hydrochloric acid to precipitate 22.8 g. of 3-amino-6-ethylpyrazinoic acid, M.P. 149–152° C. which is used directly in the next step without further purification.

*Step C: Preparation of methyl 3-amino-6-ethylpyrazinoate.*—A solution of 3-amino-6-ethylpyrazinoic acid (14 g., 0.084 mole) in a 33% solution of hydrogen chloride in methanol (160 ml.) is stirred 24 hours at room temperature. The solution is evaporated to dryness in vacuo. The residue is triturated with sodium bicarbonate solution and the insoluble product collected and recrystallized from 2-propanol to yield 4.3 g. of methyl 3-amino-6-ethylpyrazinoate, M.P. 85–87.5° C.

*Analysis.*—Calculated for $C_8H_{11}N_3O_2$: C, 53.03; H, 6.12; N, 23.19. Found: C, 53.11; H, 6.16; N, 23.26.

EXAMPLE 21

*Methyl 3-amino-5-cyclohexylpyrazinoate*

Step A: *Preparation of 7-cyclohexyllumazine.*—A suspension of 5,6-diaminouracil hydrochloride (17.9 g., 0.1 mole) in water (250 ml.) is heated to 60° C. and cyclohexylglyoxal hemihydrate (14.9 g. 0.1 mole) is added. The mixture is stirred and heated one hour on the steam bath. The mixture is cooled and the solid product is collected, dissolved in hot dilute sodium hydroxide solution, the solution filtered, and the product reprecipitated by acidification with hydrochloric acid. The product is treated with a boiling mixture of water (40 ml.) and acetic acid (90 ml.). A small amount of insoluble material is filtered off. The filtrate when cooled deposits 7.5 g. of 7-cyclohexyllumazine, M.P. 217–227° C. A further recrystallization from aqueous acetic acid increases the melting point to 229–231° C.

*Analysis.*—Calculated for $C_{12}H_{14}N_4O_2$: C, 58.52; H, 5.73; N, 22.75. Found: C, 58.59; H, 5.52; N, 23.02.

Step B: *Preparation of 3-amino-5-cyclohexylpyrazinoic acid.*—A solution of 7-cyclohexyllumazine (18.5 g., 0.075 mole) and sodium hydroxide (9.0 g., 0.225 mole) in water (90 ml.) is heated 17 hours at 165° C. in a sealed autoclave. The contents of the autoclave are flushed out with water (200 ml.). The insoluble material is filtered off and the filtrate acidified with hydrochloric acid to precipitate 12.5 g. of crude product, M.P. 172–176° which, when recrystallized from aqueous 2-propanol yields 8.0 g. of 3-amino-5-cyclohexylpyrazinoic acid, M.P. 182.5–183.5° C.

*Analysis.*—Calculated for $C_{11}H_{15}N_3O_2$: C, 59.71; H, 6.83; N, 18.99. Found: C, 59.99; H, 6.56; N, 18.98.

Step C: *Preparation of methyl 3-amino-5-cyclohexylpyrazinoate.*—This compound is prepared by essentially the same method described in Example 20, Step C, except that an equimolecular quantity of 3-amino-5-cyclohexylpyrazinoic acid is substituted for the 3-amino-6-ethylpyrazinoic acid of Example 20, Step C. The product has a M.P. of 173–174.5° C.

*Analysis.*—Calculated for $C_{12}H_{17}N_3O_2$: C, 61.25; H, 7.28; N, 17.86. Found: C, 61.35; H, 7.39; N, 17.83.

EXAMPLE 22

*Methyl 3-amino-6-cyclohexylpyrazinoate*

Step A: *Preparation of 3-amino-6-cyclohexylpyrazinamide.*—This compound is prepared by essentially the same method described in Example 20, Step A, except that an equimolecular quantity of cyclohexylglyoxal is substituted for the ethylglyoxal employed in Example 20, Step A.

Step B: *Preparation of 3-amino-6-cyclohexylpyrazinoic acid.*—This compound is prepared by essentially the same method described in Example 20, Step B, except that an equimolecular quantity of 3-amino-6-cyclohexylpyrazinamide is substituted for the 3-amino-6-ethylpyrazinamide employed in Example 20, Step B.

Step C: *Preparation of methyl 3-amino-6-cyclohexylpyrazinoate.*—This compound is prepared by essentially the same method described in Example 20, Step C, except that an equimolecular quantity of 3-amino-6-cyclohexylpyrazinoic acid is substituted for the 3-amino-6-ethylpyrazinoic acid employed in Example 20, Step C. The methyl 3-amino-6-cyclohexylpyrazinoate thus obtained melts at 126.5–128.0° C.

*Analysis.*—Calculated for $C_{12}H_{17}N_3O_2$: C, 61.25; H, 7.28; N, 17.86. Found: C, 61.39; H, 7.12; N, 17.87.

EXAMPLE 23

*Methyl 3-amino-6-cyclopropylpyrazinoate*

Step A: *Preparation of 3-amino-6-cyclopropylpyrazinamide.*—This compound is prepared by essentially the same method described in Example 20, Step A, except that an equimolecular quantity of cyclopropylglyoxal is substituted for the ethylglyoxal used in Example 20, Step A. The product has a melting point of 185.5–187.5° C.

*Analysis.*—Calculated for $C_8H_{10}N_4O$: C, 53.92; H, 5.66. Found: C, 53.83; H, 5.43.

Step B: *Preparation of 3-amino-6-cyclopropylpyrazinoic acid.*—This compound is prepared by essentially the same method described in Example 20, Step B, except that an equimolecular quantity of 3-amino-6-cyclopropylpyrazinamide is substituted for the 3-amino-6-ethylpyrazinamide employed in Example 20, Step B. The product has a melting point of 169–172° C. and is used directly without further purification in the next step.

Step C: *Preparation of methyl 3-amino-6-cyclopropylpyrazinoate.*—This compound is prepared by essentially the same method described in Example 20, Step C, except that an equimolecular quantity of 3-amino-6-cyclopropylpyrazinoic acid is substituted for the 3-amino-6-ethylpyrazinoic acid employed in Example 20, Step C. The product has a melting point of 112.5–114.5° C.

*Analysis.*—Calculated for $C_9H_{11}N_3O_2$: C, 55.95; H, 5.74. Found: C, 55.61; H, 5.64.

EXAMPLE 24

*Methyl 3-amino-5-phenylpyrazinoate*

This compound is prepared by essentially the same method described in Example 20, Step C, except that an equimolecular quantity of 3-amino-5-phenylpyrazinoic acid is substituted for the 3-amino-6-ethylpyrazinoic acid employed in Example 20, Step C. The product has a melting point of 231–232° C.

*Analysis.*—Calculated for $C_{12}H_{11}N_3O_2$: N, 18.32. Found: N, 18.27.

EXAMPLE 25

*Methyl 3-amino-6-phenylpyrazinoate*

3-amino-6-phenylpyrazinoic acid (30 g., 0.14 mole) is added to a solution of hydrogen chloride (480 g.) in methanol (1500 ml.), and the mixture is stirred for 42 hours at room temperature. The mixture then is evaporated in vacuo to about one-quarter volume and poured into 1 liter of water. The mixture is made basic by the addition of sodium bicarbonate, and the product collected and recrystallized from methanol to give 21 g. of methyl 3-amino-6-phenylpyrazinoate, M.P. 140–141° C.

*Analysis.*—Calculated for $C_{12}H_{11}N_3O_2$: C, 62.93; H, 4.84; N, 18.32. Found: C, 62.72; H, 4.90; N, 18.27.

EXAMPLE 26

*Methyl 3-amino-5-chloro-6-phenylpyrazinoate*

A mixture of methyl 3-amino-6-phenylpyrazinoate from Example 25, (28.6 g., 0.125 mole) and sulfuryl chloride (90 ml.) is stirred at room temperature for 1.5 hours. Excess sulfuryl chloride is removed by vacuum distillation. The residue is suspended in water and the mixture neutralized by addition of sodium bicarbonate solution. The insoluble product formed is collected and recrystallized from acetic acid to yield 15 g. of methyl 3-amino-5-chloro-6-phenylpyrazinoate, M.P. 184–190° C. Following repeated recrystallizations from acetic acid the melting point is increased to 187.5–191.5° C.

*Analysis.*—Calculated for $C_{12}H_{10}ClN_3O_2$: C, 54.66; H, 3.82; N, 15.94. Found: C, 54.58; H, 3.59; N, 15.98.

EXAMPLE 27

*Methyl 3-amino-6-bromo-5-phenylpyrazinoate*

A solution of bromine (11.2 g., 0.07 g. atom) and methyl 3-amino-5-phenylpyrazinoate, from Example 24, (10.5 g., 0.046 mole) in acetic acid (700 ml.) is heated 21 hours at 85° C. The solution then is poured into 2 liters of water. The solid product that precipitates is collected and recrystallized from acetic acid to yield 10.5 g. of methyl 3-amino-6-bromo-5-phenylpyrazinoate, M.P. 217–221° C.

*Analysis.*—Calculated for $C_{12}H_{10}BrN_3O_2$: C, 46.77; H, 3.27; N, 13.64. Found: C, 46.83; H, 3.23; N, 13.57.

EXAMPLE 28

*Methyl 3-amino-6-(p-chlorophenyl) pyrazinoate*

*Step A: Preparation of 3-amino - 6 - p - chlorophenylpyrazinoic acid.*—p - Chlorophenylglyoxal monohydrate (34.5 g., 0.184 mole) is added to a solution of aminomalonamidamidine dihydrochloride (41.1 g., 0.22 mole) in water (1400 ml.). The mixture is made basic by the addition of concentrated ammonium hydroxide (40 ml.) and stirred 20 hours at room temperature. The precipitate, consisting of 3 - amino - 6 - p - chlorophenylpyrazinamide, is collected, washed with hot ethanol, and hydrolyzed by being heated for 5.5 hours on the steam bath with 5% sodium hydroxide solution (1200 ml.). The resulting solution is cooled and the sodium salt of 3 - amino-6-p-chlorophenylpyrazinoic acid precipitates. The salt is collected and dissolved in boiling water, the solution is acidified with concentrated hydrochloric acid, and the precipitated acid is recrystallized from acetic acid to yield 10.5 g. of 3-amino-6-p-chlorophenylpyrazinoic acid, M.P. 207–213° C. A further recrystallization from acetic acid raises the melting point to 213–215° C.

*Analysis.*—Calculated for $C_{11}H_8ClN_3O_2$: C, 52.92; H, 3.23; N, 16.83. Found: C, 52.69; H, 3.19; N, 16.89.

*Step B: Preparation of methyl 3-amino-6-(p-chlorophenyl)pyrazinoate.*—This compound is prepared by essentially the same method described in Example 25 except that an equimolecular quantity of 3-amino-6-p-chlorophenylpyrazinoic acid is substituted for the 3-amino-6-phenylpyrazinoic acid of Example 25. The product has a melting point of 181.5–183.5° C.

*Analysis.*—Calculated for $C_{12}H_{10}ClN_3O_2$: C, 54.66; H, 3.82; N, 15.94. Found: C, 54.37; H, 3.69; N, 15.92.

EXAMPLE 29

*3-amino-5(or 6)-phenyl-6(or 5)-methylpyrazinoylguanidine* and

*3-amino-5(or 6)-methyl-6(or 5)-phenylpyrazinoylguanidine*

*Step A: Preparation of 6(or 7)-methyl-7(or 6)-phenyllumazine and 6(or 7)-phenyl-7(or 6)-methyllumazine.*—To a suspension of 4,5-diamino-2,6-dihydroxypyrimidine hydrochloride (103.59 g., 0.58 mole) in a mixture of water (1500 ml.) and concentrated ammonium hydroxide (300 ml.) at 60° C. is added 1-phenyl-1,2-propanedione (103.71 g., 0.7 mole) in one portion. The mixture is heated on a steam bath at 90° C. for 1 hour with vigorous stirring. The reaction mixture is cooled and neutralized with acetic acid whereupon a yellow solid (165 g.) M.P. 202–233° C.( dec.) is obtained. Recrystallization of the solid from glacial acetic acid (7 ml./g.) gives a solid (A) (91.8 g.), M.P. 276–279° C. and from the filtrate, after standing, a second solid (I) (36.5 g.) M.P. 250–253° C. Two additional recrystallizations of solid (A) from glacial acetic acid (10 ml./g.) give 82.4 g. (56%) of crystalline 6(or 7)-methyl-7(or 6)-phenyllumazine, M.P. 281.5–282.5° C.

*Analysis.*—Calculated for $C_{13}H_{10}N_4O_2$: C, 61.41; H, 3.96; N, 22.04. Found: C, 61.78; H, 3.91; N, 22.08.

Two recrystallizations of solid (I) from glacial acetic acid (3 ml./g.) give 32 g. (22%) of crystalline 6(or 7)-phenyl-7(or 6)-methyllumazine, M.P. 254.5–255.5° C.

*Analysis.*—Calculated for $C_{13}H_{10}N_4O_2$: C, 61.41; H, 3.96; N, 22.04. Found: C, 61.79; H, 4.09; N, 22.14.

*Step B: Preparation of 3-amino-5(or 6)-phenyl-6(or 5)-methyl pyrazinoic acid.*—A mixture of 6(or 7)-methyl-7(or 6)-phenyllumazine (40.68 g., 0.16 mole) and 8% sodium hydroxide solution (14.88 g., 0.372 mole) is heated in an autoclave at 170° C. for 3½ hours. After cooling, the reaction mixture is filtered, the resulting solid sodium salt of the product is dissolved in boiling water (600 ml.) and acidified with acetic acid, yielding 29.64 g. (81%) of 3-amino-5(or 6)-phenyl-6(or 5)-methylpyrazinoic acid, M.P. 193.5–194.5° C.

*Analysis.*—Calculated for $C_{12}H_{11}N_3O_2$: C, 62.87; H, 4.84; N, 18.33. Found: C, 62.97; H, 4.68; N, 18.46.

*Preparation of 3-amino-5(or 6)-methyl-6(or 5)-phenylpyrazinoic acid.*—A mixture of 6(or 7)-phenyl-7(or 6)-methyllumazine (30.51 g., 0.12 mole) and 8% sodium hydroxide solution (11.16 g., 0.279 mole) is heated in an autoclave at 170° C. for 3½ hours. The solid sodium salt of the product is collected by filtration, dissolved in boiling water (200 ml.) and acidified with acetic acid, yielding 20.9 g. (76%) of a solid 3-amino-5(or 6)-methyl-6(or 5)-phenylpyrazinoic acid, M.P. 153.5–154.5° C. Recrystallization from a mixture of ethanol and water gives 19.09 g. of product in the form of yellow rods, M.P. 155–156° C.

*Analysis.*—Calculated for $C_{12}H_{11}N_3O_2$: C, 62.87; H, 4.84; N, 18.33. Found: C, 62.95; H, 4.80; N, 18.54.

*Step C: Preparation of methyl 3-amino-5(or 6)-phenyl-6(or 5)-methylpyrazinoate.*—To a solution prepared by passing dry hydrogen chloride gas (485 g.) into chilled anhydrous methanol (1620 ml.) is added finely ground 3-amino-5(or 6)-phenyl-6(or 5)-methylpyrazinoic acid (15 g., 0.0655 mole). The resulting suspension is stirred at room temperature for 21 hours. The reaction mixture is concentrated, under reduced pressure, to a volume of 300 ml. and the residue is poured into ice water (600 ml.). The insoluble hydrochloride salt is collected and treated with aqueous sodium bicarbonate solution, with good stirring. There is obtained 14.83 g. (93%) of solid methyl 3-amino-5(or 6)-phenyl-6(or 5)-methyl-pyrazinoate, M.P. 160.5–162.5° C. Two recrystallizations from methanol give 11.08 g. of product in the form of yellow prisms, M.P. 163–164° C.

*Analysis.*—Calculated for $C_{13}H_{13}N_3O_2$: C, 64.18; H, 5.39; N, 17.27. Found: C, 64.42; H, 5.24; N, 17.35.

*Preparation of methyl 3-amino-5(or 6)-methyl-6(or 5) phenylpyrazinoate.*—To a solution prepared by passing dry hydrogen chloride gas (450 g.) into chilled anhydrous methanol (1500 ml.) is added finely ground 3-amino-5(or 6)-methyl-6(or 5)-phenylpyrazinoic acid (15 g., 0.0655 mole). The resulting solution is stirred at room temperature for 21 hours. The reaction mixture is concentrated, under reduced pressure, to a volume of 100 ml. The residue is poured into ice water (100 ml.) and treated with excess aqueous sodium bicarbonate solution. There is obtained 15.71 g. (99%) of solid methyl 3-amino-5(or 6)-methyl-6(or 5)-phenylpyrazinoate, M.P. 161.5–162.5° C. Recrystallization from methanol gives 13.56 g. of the product in the form of yellow rods, M.P. 162.5–163.5° C.

*Analysis.*—Calculated for $C_{13}H_{13}N_3O_2$: C, 64.18; H, 5.39; N, 17.27. Found: C, 64.26; H, 5.44; N, 17.23.

EXAMPLE 30

*Methyl 3-amino-5-dimethylamino-6-phenylpyrazinoate*

*Step A: Preparation of methyl 3-amino-5-chloro-6-phenylpyrazinoate.*—A mixture of methyl 3-amino-6-phenyl-pyrazinoate, from Example 25, (1.3 g., 0.0057 mole) and sulfuryl chloride (4 ml.) is stirred 6 hours at room temperature. Excess sulfuryl chloride is removed by evaporation in vacuo. The residue is washed with sodium bicarbonate solution and recrystallized from acetic acid to yield 0.4 g. of 3-amino-5-chloro-6-phenylpyrazinoate, M.P. 187.5–190.5° C.

*Analysis.*—Calculated for $C_{12}H_{10}ClN_3O_2$: C, 54.66; H, 3.82; N, 15.94. Found: C, 54.58; H, 3.59; N, 15.98.

*Step B: Preparation of methyl 3-amino-5-dimethylamino-6-phenylpyrazinoate.*—A mixture of methyl 3-amino-5-chloro-6-phenylpyrazinoate (2.6 g., 0.01 mole) dimethylamine (8 g.) and methanol (40 ml.) is stirred 16 hours at room temperature. The solid product that forms is collected and recrystallized from methanol to yield 1.4 g. of methyl 3-amino-5-dimethylamino-6-phenylpyrazinoate, M.P. 167.5–169.5° C.

EXAMPLE 31

*Methyl 3-isopropylideneamino-6-anilinopyrazinoate*

Step A: Preparation of methyl 3-amino-6-chloropyrazinoate.—A 5-liter, 3-necked flask equipped with a mechanical stirrer, thermometer and gas inlet tube is charged with a warm (about 38° C.) mixture of water (3180 ml.) and glacial acetic acid (750 ml.) and methyl 3-aminopyrazinoate (90 g., 0.588 mole) then is added. The stirrer is started and the mixture heated to 41° C. which causes nearly all the ester to dissolve. The solution then is cooled to just below 40° C. via an ice bath. With vigorous stirring, chlorine (about 140 g.) is passed through the solution over a period of 25 minutes. A precipitate begins to form after five minutes and becomes voluminous by the end of the reaction. The temperature drops to 20–25° C. during the reaction. The nearly white precipitate, which is methyl 3-chloroamino-6-chloropyrazinoate, is removed by filtration and washed with a small amount of ice water. A small amount of this material, when recrystallized from warm acetic acid, melts at 142° C. (dec.)

*Analysis.*—Calculated for $C_6H_5Cl_2N_3O_2$: C, 32.46; H, 2.27; N, 18.93; Cl (total) 31.94; Cl (active) 15.97. Found: C, 32.82; H, 2.34; N, 18.90; Cl (total) 32.09; Cl (active) 16.06.

Step B: Preparation of methyl 3-isopropylideneamino-6-anilinopyrazinoate.—A solution of methyl 3-amino-6-chloropyrazinoate (18.8 g., 0.1 mole), aniline (15 g., 0.16 mole) and concentrated hydrochloric acid (2.5 ml.) in acetone (150 ml.) is refluxed 16 hours and then chilled. The crystalline product which separates is recrystallized from aqueous 2-propanol to yield 7.4 g. of methyl 3-isopropylideneamino - 6 - anilinopyrazinonate M.P. 193.5–197.5° C. After a further recrystallization from 2-propanol, the product melts at 195.5–197.5° C.

*Analysis.*—Calculated for $C_{15}H_{16}N_4O_2$: C, 63.36; H, 5.67; N, 19.71. Found: C, 63.45; H, 5.66; N, 19.81.

EXAMPLE 32

*Preparation of methyl 3-amino-5,6,7,8-tetrahydroquinoxaline-2-carboxylate*

A 500 ml. round-bottomed flask equipped with a magnetic stirrer, dropping funnel and drying tube is charged with 3-amino-5,6,7,8-tetrahydroquinoxaline - 2-carboxylic acid (9.3 g., 0.0482 mole) and anhydrous methanol (230 ml.). The mixture is cooled to 10° C. in ice water and, over a period of one hour, concentrated sulfuric acid (30 ml.) is added. After standing at room temperature for 24 hours, the excess methanol is removed by evaporation in vacuo. The residue is made basic to litmus paper by the addition of aqueous sodium bicarbonate and then extracted with ether. Evaporation of the ether extract gives a crude product which, when recrystallized first from methylcyclohexane then from a 1:5 methanol-water mixture yields 1.6 g. (16%) of pure methyl 3-amino-5,6,7,8-tetrahydroquinoxaline - 2-carboxylate M.P. 154–155° C.

*Analysis.*—Calculated for $C_{10}H_{13}N_3O_2$: C, 57.95; H, 6.32; N, 20.28. Found: C, 58.02; H, 6.33; N, 20.46.

EXAMPLE 33

*Preparation of (3-amino-7-chloro-2-quinoxalinecarbonyl)guanidine*

Step A: Preparation of 7-chloroalloxazine and 8-chloroalloxazine.—A mixture of water (600 ml.), 12 N hydrochloric acid (500 ml.) and 4-chloro-o-phenylenediamine (60.00 g.; 0.42 mole) is heated on a steam bath to 60° C. to effect solution and treated with a solution of alloxan monohydrate (61.44 g., 0.384 mole) in water (100 ml.). The mixture is then heated at 90° C. for 1 hour with stirring. The hot mixture is filtered and the residual solid is washed with two 300 ml. portions of boiling water yielding 78.4 g. (82%) of material melting at 330–348° C. (dec.). Recrystallization from dimethylformamide (10 ml./g.) gives solid 8-chloroalloxazine (A), M.P. 347–355° C.[1] and treating the filtrate with boiling water produces a second solid, 7-chloroalloxazine (I), M.P. 353–375° C.[1] Two additional recrystallizations of solid (A) from dimethyl formamide give 31.10 g. (33%) of 8-chloroalloxazine, M.P. 365–366° C.[1]

*Analysis.*—Calculated for $C_{10}H_5ClN_4O_2$: C, 48.31; H, 2.03; Cl, 14.26; N, 22.54. Found: C, 48.48; H, 1.88; Cl, 14.11; N, 22.28.

Recrystallization of solid I from dimethyl sulfoxide at 150° C. gives 40.35 g. (42%) of 7-chloroalloxazine, M.P. >380° C.
Found: C, 48.30; H, 2.11; Cl, 14.06; N, 22.57.

Step B: Preparation of 3-amino-7-chloroquinoxaline-2-carboxylic acid.—A mixture of 7-chloroalloxazine (44.2 g., 0.178 mole) and concentrated ammonium hydroxide (190 ml.) is heated in an autoclave at 165° C. for 10 hours. The reaction mixture is treated with water (2300 ml.) at 90° C., filtered and the pH of the hot filtrate is adjusted to 3.5–4.0 by the addition of 12 N hydrochloric acid, yielding 27.2 g., (68%) of 3-amino-7-chloroquinoxaline-2-carboxylic acid in the form of a yellow solid, M.P. 191–192° C. (dec.).

Step C: Preparation of methyl 3-amino-7-chloroquinoxaline-2-carboxylate.—To a solution prepared by passing dry hydrogen chloride gas (300 g.) into chilled anhydrous methanol (1000 ml.), is added finely ground 3-amino-7-chloroquinoxaline - 2-carboxylic acid. The solid is completely dissolved during 17½ hours of stirring at room temperature. The reaction solution is concentrated to dryness under reduced pressure, the residue is treated with cold water (100 ml.) and made basic by adding aqueous sodium bicarbonate solution. There is obtained a solid, M.P. 207–209° C. After two recrystallizations from acetonitrile there remains 6.06 g. (67%) methyl-3-amino-7-chloroquinoxaline - 2-carboxylate in the form of needles, M.P. 221.5–223.5° C. Two additional recrystallizations from acetonitrile give material melting at 224.5–225.5° C.

*Analysis.*—Calculated for $C_{10}H_8ClN_3O_2$: C, 50.54; H, 3.39; N, 17.68. Found: C, 50.23; H, 3.21; N, 17.68.

Other methyl 3-amino-5-substituted-amino-6-chloropyrazinoates prepared by substantially the same process described in Example 6 are identified in Table I. In each instance the dimethylamine of Example 6 is replaced by an amine of the type $RR^1NH$ and reacted with methyl 3-amino-5,6-dichloropyrazinoate as shown below:

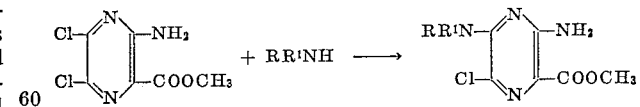

The radicals R and $R^1$ in the starting amine in each instance are retained in the end product and are identified in columns 2 and 3 of Table I. The molar ratio of the reactants are usually the same as in Example 6, that is, a ratio of one mole of ester to 5 moles of amine. However, the reaction can be carried out with as little as 2 moles of amine. The reactants and reaction times as well as data concerning each product, that is, crystallization solvent, yield, melting point and elementary analysis are presented in the table. All other reaction conditions are approximately as described in Example 6 unless otherwise specified.

---
[1] Melting point is uncorrected.

TABLE I

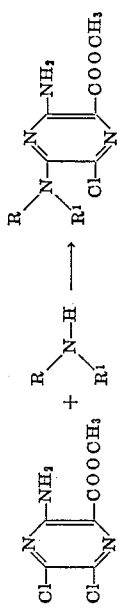

| Ex. No. | R | R¹ | Reaction Time in hours | Crystallization Solvent | Yield, Percent | M.P., °C. | Empirical Formula | | Analysis | | |
|---|---|---|---|---|---|---|---|---|---|---|---|
| | | | | | | | | | C | H | N |
| 34 | $CH_3$ | H | 24 | 2-propanol | 88 | 221-222 | $C_7H_9ClN_4O_2$ | Calc. | 38.81 | 4.19 | 25.86 |
| | | | | | | | | Found | 38.74 | 4.22 | 25.49 |
| 35 | $C_2H_5$ | H | ½ | ---do--- | 89 | 149-150 | $C_8H_{11}ClN_4O_2$ | Calc. | 41.66 | 4.81 | 24.29 |
| | | | | | | | | Found | 42.11 | 5.05 | 24.24 |
| 36 | $CH_3(CH_2)_2-$ | H | ¼ | ---do--- | 75 | 138-140 | $C_9H_{13}ClN_4O_2$ | Calc. | 44.18 | 5.36 | 22.90 |
| | | | | | | | | Found | 44.21 | 5.39 | 22.89 |
| 37 | $(CH_3)_2CH$ | H | ¾ | ---do--- | 70 | 125.5-126.5 | $C_9H_{13}ClN_4O_2$ | Calc. | 44.18 | 5.36 | 22.90 |
| | | | | | | | | Found | 43.82 | 5.18 | 22.62 |
| 38 | $CH_2=CH-CH_2$ | H | ½ | ---do--- | 69 | 105-106.5 | $C_9H_{11}ClN_4O_2$ | Calc. | 44.54 | 4.57 | 23.09 |
| | | | | | | | | Found | 44.46 | 4.61 | 23.12 |
| 39 | $CH_3(CH_2)_3-$ | H | ½ | ---do--- | 91 | 140-142 | $C_{10}H_{15}ClN_4O_2$ | Calc. | 46.42 | 5.84 | 21.66 |
| | | | | | | | | Found | 46.39 | 5.77 | 21.67 |
| 40 | $CH_3CH_2CH(CH_3)$ | H | 1 | ---do--- | 75 | 106-108 | $C_{10}H_{15}ClN_4O_2$ | Calc. | 46.42 | 5.84 | 21.66 |
| | | | | | | | | Found | 46.46 | 6.04 | 21.65 |
| 41 | $(CH_3)_2CHCH_2$ | H | ⅓ | ---do--- | 51 | 113.5-115.5 | $C_{10}H_{15}ClN_4O_2$ | Calc. | 46.42 | 5.84 | 21.66 |
| | | | | | | | | Found | 46.34 | 5.80 | 21.64 |
| 42 | $(CH_3)_3C$ | H | 2⅔ | Dimethylformamide water | 38 | 98-108 | $C_{10}H_{15}ClN_4O_2$ | Calc. | 46.42 | 5.84 | 21.66 |
| | | | | | | | | Found | 46.31 | 5.72 | 21.25 |
| 43 | $CH_3(CH_2)_4$ | H | ¼ | Cyclohexane | 72 | 100.5-102.5 | $C_{11}H_{17}ClN_4O_2$ | Calc. | 48.44 | 6.28 | 20.54 |
| | | | | | | | | Found | 48.27 | 6.09 | 20.45 |
| 44 | $CH_3CH_2CH_2CH(CH_3)$ | H | 1 | | | | Compound used in next step without purification. | | | | |
| 45 | $(C_2H_5)_2CH$ | H | 1 | | | | Compound used in next step without purification. | | | | |
| 46 | $CH_3(CH_2)_5$ | H | ¼ | ---do--- | 70 | 72.5-75.5 | $C_{12}H_{19}ClN_4O_2$ | Calc. | 50.25 | 6.68 | 19.54 |
| | | | | | | | | Found | 50.27 | 6.60 | 19.45 |
| 47 | cyclopropyl-$CH_2$ | H | ⅜ | 2-propanol | 78 | 132-133 | $C_{10}H_{13}ClN_4O_2$ | Calc. | 46.78 | 5.10 | 21.83 |
| | | | | | | | | Found | 46.93 | 5.18 | 21.92 |
| 48 | cyclopropyl | H | 1 | ---do--- | 98 | 167-169 | $C_9H_{11}ClN_4O_2$ | Calc. | 44.54 | 4.57 | 23.09 |
| | | | | | | | | Found | 44.63 | 4.52 | 23.09 |
| 49 | cyclohexyl | H | ¾ | ---do--- | 93 | 119.5-121.5 | $C_{11}H_{15}ClN_4O_2$ | Calc. | 48.80 | 5.58 | 20.70 |
| | | | | | | | | Found | 48.91 | 5.39 | 20.59 |
| 50 | phenyl-$CH_2$ | H | (*) | Methanol | 64 | 157-158 | $C_{12}H_{13}ClN_4O_2$ | Calc. | 53.34 | 4.48 | 19.14 |
| | | | | | | | | Found | 53.46 | 4.46 | 19.22 |
| 51 | $CH_3$-phenyl-$CH_2$ | H | 1 | 2-propanol | 66 | 112.5-114.5 | $C_{14}H_{15}ClN_4O_2$ | Calc. | 54.81 | 4.93 | 18.27 |
| | | | | | | | | Found | 55.24 | 4.99 | 18.20 |

See footnotes at end of table.

TABLE I—Continued

| Ex. No. | R | R¹ | Reaction Time in hours | Crystallization Solvent | Yield, Percent | M.P., °C. | Empirical Formula | End Product | Analysis C | H | N |
|---|---|---|---|---|---|---|---|---|---|---|---|
| 52 | F-C₆H₄-CH₂ | H | 1 | ----do---- | 84 | 171-174 | $C_{13}H_{12}ClFN_4O_2$ | Calc. Found | 50.25 50.05 | 3.89 4.08 | 18.03 18.06 |
| 53 | Cl-C₆H₄-CH₂ | H | 1 | Triturate with hot water | 93 | 136-137 | $C_{13}H_{12}Cl_2N_4O_2$ | Compound used in next step without purification. | | | |
| 54 | C₆H₅-CH₂CH₂ | H | 1 | 2-propanol | 59 | 115-119 | $C_{14}H_{15}ClN_4O_2$ | Calc. Found | 54.81 55.25 | 4.93 4.88 | 18.27 18.13 |
| 55 | CF₃CH₂ | H | (*) | ----do---- | 97 | 153-154 | $C_8H_8N_4ClF_3O_2$ | Calc. Found | 33.76 34.10 | 2.83 3.08 | 19.69 19.57 |
| 56 | CF₃CH₂CH₂ | H | Sealed tube 72 | 2-propanol-H₂O | 76 | 124.5-125.5 | $C_9H_{10}ClF_3N_4O_2$ | Calc. Found | 36.19 36.46 | 3.37 3.22 | 18.76 18.70 |
| 57 | HOCH₂CH₂ | H | 2½ | 2-propanol | 100 | 155-157 | $C_8H_{11}ClN_4O_3$ | Compound used in next step without purification. | | | |
| 58 | CH₂OH(CHOH)₄CH₂ | H | 1 | Triturate with ethanol | 60 | 172-175 | $C_{12}H_{19}ClN_4O_7$ | Compound used in next step without purification. | | | |
| 59 | H₂NCH₂CH₂ | H | 2 | Methanol | 96 | 265 | $C_8H_{12}ClN_5O_2 \cdot HCl$ | Calc. Found Calc. Found | 34.05 35.12 38.72 39.25 | 4.64 4.56 5.52 5.55 | 24.82 24.61 22.58 22.33 |
| 60 | (CH₃)₂NCH₂CH₂ | H | ⅓ | ----do---- | 40 | 257 | $C_{10}H_{17}ClN_5O_2 \cdot HCl$ | | | | |
| 61 | pyridyl-CH₂ | H | 1 | Dissolve in acid precipitate with base | 69 | 95-97 | $C_{12}H_{13}ClN_5O_2$ | Calc. Found | 49.07 48.66 | 4.12 5.03 | 23.85 23.35 |
| 62 | furyl-CH₂ | H | ½ | 2-propanol | 81 | 148-149 | $C_{11}H_{11}ClN_4O_3$ | Calc. Found | 46.73 46.14 | 3.92 4.08 | 19.82 19.57 |
| 63 | CH₃ | C₂H₅ | 1 | ----do---- | 73 | 102-104 | $C_9H_{13}ClN_4O_2$ | Calc. Found | 44.18 44.16 | 5.36 5.24 | 22.90 22.81 |
| 64 | CH₃ | CH₃(CH₂)₂ | ½ | ----do---- | 58 | 83.5-85.5 | $C_{10}H_{15}ClN_4O_2$ | Calc. Found | 46.42 46.55 | 5.84 5.75 | 21.66 21.70 |
| 65 | CH₃ | (CH₃)₂CH | ¼ | ----do---- | 78 | 75.5-77.5 | $C_{10}H_{15}ClN_4O_2$ | Calc. Found | 46.42 46.70 | 5.84 5.97 | 21.66 21.46 |
| 66 | CH₃ | CH₂=CH-CH₂ | 1 | ----do---- | 70 | 90.5-92 | $C_{10}H_{13}ClN_4O_2$ | Calc. Found | 46.78 46.85 | 5.10 5.08 | 21.83 21.73 |
| 67 | CH₃ | CH₃(CH₂)₃ | ¼ | ----do---- | 74 | 59.5-61.5 | $C_{11}H_{17}ClN_4O_2$ | Calc. Found | 48.44 48.60 | 6.28 6.22 | 20.54 20.54 |
| 68 | C₂H₅ | C₂H₅ | ¼ | Petroleum ether | 54 | 99-101 | $C_{10}H_{15}ClN_4O_2$ | Calc. Found | 46.42 46.75 | 5.84 5.79 | 21.66 21.45 |
| 69 | C₂H₅ | CH₃(CH₂)₂ | 1 | | | | | Compound used in next step without purification. | | | |
| 70 | C₂H₅ | (CH₃)₂CH | 24 | | | | | Compound used in next step without purification. | | | |
| 71 | C₂H₅ | CH₂=CHCH₂ | 1 | | | | | Compound used in next step without purification. | | | |
| 72 | C₂H₅ | CH₃(CH₂)₃ | | | 91 | 77.5-79.5 | $C_{12}H_{19}ClN_4O_2$ | Calc. Found | 50.25 49.81 | 6.68 6.28 | 19.54 19.45 |
| 73 | CH₃(CH₂)₂ | CH₃(CH₂)₂ | 1 | 2-propanol | 66 | 68.5-71.5 | $C_{12}H_{19}ClN_4O_2$ | Calc. Found | 50.25 49.91 | 6.68 6.74 | 19.54 19.44 |
| 74 | CH₃(CH₂)₂ | CH₃(CH₂)₃ | 1 | | | | | Compound used in next step without purification. | | | |

See footnotes at end of table.

TABLE I—Continued

| Ex. No. | R | R¹ | Reaction Time in hours | Crystallization Solvent | Yield, Percent | M.P., °C. | Empirical Formula | End Product Analysis | | | |
|---|---|---|---|---|---|---|---|---|---|---|---|
| | | | | | | | | | C | H | N |
| 75 | | ① H | ½ | 2-propanol | 95 | 168–171 | C₁₀H₁₃ClN₄O₂ | Calc. Found | 46.78 47.01 | 5.10 4.95 | 21.83 21.86 |
| 76 | | ② H | ¼ | do | 75 | 109–111 | C₁₂H₁₇ClN₄O₂ | Calc. Found | 50.61 50.54 | 6.02 5.79 | 19.68 19.60 |
| 77 | | ③ H CH₃—N | 20 | do | 88 | 186–188 | C₁₁H₁₅ClN₅O₂ | Calc. Found | 46.23 46.36 | 5.64 5.49 | 24.51 24.02 |
| 78 | CH₃ | ④ NH₂ | ½ | Ethanol | 67 | 136.5–138 | C₇H₁₀ClN₅O₂ | Calc. Found | 36.29 36.54 | 4.35 4.08 | 30.23 30.82 |

*The reaction is run without a solvent using a large excess of amine and heating 30 seconds on a steam bath. ① 1-pyrrolidinyl radical. ② Hexahydro-1-azepinyl radical. ③ 4-methyl-1-piperazinyl radical.

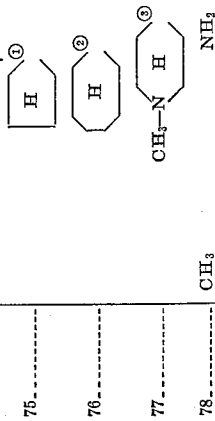

The following examples describe the preparation of products representative of the novel compounds of this invention.

Examples 79 through 81 illustrate the three preferred methods (Methods A, B and C) described in the introductory portion of the specification for the preparation of the novel products of this invention.

METHOD A—EXAMPLE 79

(3-amino-5-dimethylamino-6-chloropyrazinoyl)-guanidine and its hydrochloride salt

*Step A: Preparation of the base.*—A 300 ml. one-necked, round-bottomed flask, equipped with a water-cooled condenser, calcium chloride tube and magnetic stirrer is charged with anhydrous methanol (150 ml.) and sodium metal (5.75 g., 0.25 g. atom). When the reaction is complete, the solution is treated with dry guanidine hydrochloride (26.3 g., 0.275 mole) and stirred for 10 minutes. The sodium chloride that forms is removed by filtration. The solution is concentrated in vacuo to a volume of 30 ml. and the residue treated with methyl 3-amino-5-dimethylamino-6-chloropyrazinoate (11.5 g., 0.05 mole), prepared as described in Example 6, heated one minute on a steam bath and kept at 25° C. for 1 hour. The product is filtered, washed well with water, dissolved in dilute hydrochloric acid and the free base precipitated by addition of sodium hydroxide to give a 93% yield of (3-amino-5-dimethylamino-6-chloropyrazinoyl)guanidine, M.P. 216–217° C.

*Analysis.*—Calculated for $C_8H_{12}ClN_7O$: C, 37.28; H, 4.69; N, 38.05; Cl, 13.76. Found: C, 37.24; H, 4.49; N, 37.83; Cl, 13.78.

*Step B: Preparation of hydrochloride salt.*—(3-amino-5-dimethylamino-6-chloropyrazinoyl)-guanidine (2.0 g., 0.0775 mole) is suspended in water (70 ml.) and treated with sufficient 6 N hydrochloric acid to dissolve the free base. The solution is filtered and treated with concentrated hydrochloric acid (5 ml.). The hydrochloride salt (2.2 g., 97%) separates and is recrystallized from water (50 ml.) containing concentrated hydrochloric acid (3 ml.). The (3-amino-5-dimethylamino-6-chloropyrazinoyl)guanidine hydrochloride melts at 298° C. with decomposition.

*Analysis.*—Calculated for $C_8H_{12}ClN_7O \cdot HCl$: C, 32.66; H, 4.45; N, 33.33; Cl, 24.11. Found: C, 33.03; H, 4.43; N, 33.10; Cl, 23.80.

METHOD B—EXAMPLE 80

(3-amino-5-dimethylamino-6-chloropyrazinoyl) guanidine

*Step A: Preparation of (3-amino-5,6-dichloropyrazinoyl)-guanidine hydrochloride.*—Sodium metal (920 mg., 0.04 mole) is dissolved in 2-propanol (50 ml.) under anhydrous conditions treated with guanidine hydrochloride (3.85 g., 0.04 mole), and filtered to remove the sodium chloride which forms. Methyl 3-amino-5,6-dichloropyrazinoate, from Example 1, Step A, (4.44 g., 0.02 mole) is added to the resulting guanidine solution and the mixture heated at reflux for 15 minutes and then cooled to 10° C. The solid product that forms (3.6 g., 72%) is collected, dissolved in 50 ml. of hot water containing 3 ml. of 6 N hydrochloric acid, filtered and cooled to give 3.4 g. of (3-amino-5,6-dichloropyrazinoyl)guanidine hydrochloride which melts at 259–261° C.

*Analysis.*—Calculated for $C_6H_7Cl_3N_6O$: C, 25.24; H, 2.47; N, 29.43. Found: C, 25.50; H, 2.91; N, 29.17.

*Step B: Preparation of (3-amino-5-dimethylamino-6-chloropyrazinoyl)guanidine.*—(3-amino-5,6-dichloropyrazinoyl)guanidine hydrochloride (100 mg.) is dissolved in 5 ml. of dimethylformamide to which is added 1 ml.

of commercial 25% aqueous dimethylamine. The mixture is heated 1 hour on the steam bath and then diluted with 25 ml. of water whereupon (3-amino-5-dimethylamino-6-chloropyrazinoyl)guanidine is obtained which has properties identical with the product of Example 79.

METHOD C—EXAMPLE 81

*(3-amino-5-guanidino-6-chloropyrazinoyl)guanidine dihydrochloride*

*Step A: Preparation of methyl 3-amino-5-(2-dimethylaminoethoxy) - 6 - chloropyrazinoate.*—A mixture of methyl 3 - amino - 5,6 - dichloropyrazinoate, from Example 1, Step A (11.1 g., 0.05 mole) and 2-dimethylaminoethanol (55 ml.) is heated 20 minutes on the steam bath until a solution is obtained. The solution is cooled and diluted with water to precipitate 9.5 g. of methyl 3-amino-5-(2-dimethylaminoethoxy)-6-chloropyrazinoate, M.P. 131.5–135.5° C. Recrystallization from a mixture of benzene and cyclohexane gives material melting at 134.5–136.5° C.

*Analysis.*—Calculated for $C_{10}H_{15}ClN_4O_3$: C, 43.72; H, 5.50; N, 20.40. Found: C, 43.96; H, 5.33; N, 20.30.

*Step B: Preparation of (3-amino-5-guanidino-6-chloropyrazinoyl)guanidine dihydrochloride.*—Guanidine hydrochloride (20.0 g., 0.21 mole) is added to a solution of sodium (4 g., 0.17 g. atom) in 100 ml. of 2-propanol. The resulting solution of guanidine in 2-propanol is concentrated to a syrup by vacuum distillation. Methyl 3-amino-5-(2-dimethylaminoethoxy)-6-chloropyrazinoate (9.4 g., 0.034 mole) is added and the mixture is heated for 30 minutes on the steam bath, then cooled and poured into cold water. The solid yellow product is collected on a filter, dissolved in 70 ml. of 2.5% hydrochloric acid, and precipitated as the dihydrochloride by the addition of 10 ml. of concentrated hydrochloric acid. The salt is repeatedly recrystallized from dilute hydrochloric acid to obtain 2.5 g. of (3-amino-5-guanidino-6-chloropyrazinoyl)guanidine dihydrochloride, M.P. greater than 340° C.

*Analysis.*—Calculated for $C_7H_{10}ClN_9O \cdot 2CHl$: C, 24.40; H, 3.51; N, 36.58. Found: C, 24.62; H, 3.57; N, 36.41.

EXAMPLE 82

*(3,5-diamino-6-bromopyrazinoyl)guanidine*

This compound is prepared by essentially the same method described in Example 79, except that an equimolar quantity of methyl 3,5-diamino-6-bromopyrazonoate (from Example 2, Step B) is used in place of the ester employed in Example 79 to give (3,5-diamino-6-bromopyrazinoyl)guanidine which decomposes at 232.5–235.5° C.

*Analysis.*—Calculated for $C_6H_8BrN_7O$: C, 26.29; H, 2.94; N, 35.77. Found: C, 26.34; H, 3.09; N, 35.20.

EXAMPLE 83

*(3,5-diamino-6-iodopyrazinoyl)guanidine hydrochloride*

This compound is prepared by essentially the same method described in Example 79 except that methyl 3,5-diamino-6-iodopyrazinoate (from Example 3) is used in place of the ester employed in Example 79 to give (3,5-diamino - 6 - iodopyrazinoyl)guanidine hydrochloride, M.P. 273–274° C. (dec.).

*Analysis.*—Calculated for $C_6H_9ClIN_7O$: C, 20.15; H, 2.54; N, 27.42. Found: C, 20.10; H, 2.63; N, 27.24.

EXAMPLE 84

*(3-isopropylideneamino-6-anilinopyrazinoyl)-guanidine*

This compound is prepared by essentially the same method described in Example 79, except that an equimolecular quantity of methyl 3-isopropylidene-6-anilinopyrazinoate (from Example 31) is used in place of the ester employed in Example 79 to give a 35% yield of (3-isopropylideneamino - 6 - anilinopryrazinoyl)guanidine, M.P. 214–216° C. (dec.).

*Analysis.*—Calculated for $C_{15}H_{17}N_7O$: C, 57.86; H, 5.51; N, 31.50. Found: C, 57.95; H, 5.54; N, 31.45.

EXAMPLE 85

*(3-amino-6-benzylmercaptopyrazinoyl)guanidine*

*Step A: Preparation of 3-amino - 6 - chloropyrazinamide.*—Methyl 3-amino-6-chloropyrazinoate (300 g., 1.6 mole) is added to 2 liters of concentrated ammonium hydroxide solution and the mixture stirred 16 hours at room temperature. The solid product formed is collected by filtration and dried yielding 260 g., of 3-amino-6-chloropyrazinamide, M.P. 227–230° C.

*Step B: Preparation of 4-hydroxy-6-chloropteridine.*—A mixture of 3-amino-6-chloropyrazinamide (33 g., 0.19 mole), acetic anhydride (200 ml.) and ethyl orthoformate (200 ml.) is refluxed 1.5 hours. The mixture is cooled and the product which precipitates is collected and recrystallized from aqueous 2-propanol; yield 20 g. of 4-hydroxy-6-chloropteridine, M.P. 268–270° C. (dec.).

*Analysis.*—Calculated for $C_6H_3ClN_4O$: C, 39.47; H, 1.65; N, 30.69. Found: C, 39.61; H, 1.87; N, 31.23.

*Step C: Preparation of 4-hydroxy-6-benzylmercaptopteridine.*—A solution of 4 - hydroxy-6-chloropteridine (5.5 g., 0.03 mole) and benzyl mercaptan (4.4 g., 0.035 mole) in 4% sodium hydroxide solution (100 ml.) is heated 30 minutes on the steam bath. The solution is cooled and 40% sodium hydroxide solution (20 ml.) is added to precipitate the sodium salt of the product. The salt is collected, dissolved in 250 ml. of hot water, and the solution is acidified to precipitate the product which is recrystallized from aqueous 2-propanol to yield 5.5 g. of 4 - hydroxy - 6 - benzylmercaptopteridine, M.P. 233–235° C.

*Analysis.*—Calculated for $C_{13}H_{10}N_4OS$: C, 57.76; H, 3.73; N, 20.73. Found: C, 57.79; H, 3.95; N, 20.59.

*Step D: Preparation of 3 - amino-6-benzylmercaptopyrazinoic acid.*—A solution of 4-hydroxy-6-benzylmercaptopteridine (42.2 g., 0.156 mole) in 5% sodium hydroxide solution (600 ml.) is heated 8 hours on the steam bath. The solution is chilled to precipitate the sodium salt of the product. The salt is dissolved in hot water and the solution acidified to precipitate 23 g. of 3-amino-6 - benzylmercaptopyrazinoic acid, M.P. 127–139° C. After an additional recrystallization from ethyl acetate the product melts at 138–139° C.

*Analysis.*—Calculated for $C_{12}H_{11}N_3O_2S$: C, 55.16; H, 4.24; N, 16.08. Found: C, 54.75; H, 4.10; N, 15.96.

*Step E: Preparation of 2-methyl-6-benzylmercapto-4-H-pyrazino[2,3-d][1,3]oxazin-4-one.*—A solution of 3-amino-6-benzylmercaptopyrazinoic acid (8.5 g., 0.0325 mole) in acetic anhydride (50 ml.) is heated for 5 hours on the steam bath. Volatile materials are distilled in vacuo and the residue is recrystallized from benzene to give 6.6 g. of 2-methyl-6-benzylmercapto-4-H-pyrazino-[2,3-d][1,3]oxazin-4-one, M.P. 116.5–118.5° C.

*Analysis.*—Calculated for $C_{14}H_{11}N_3O_2S$: C, 58.93; H, 3.89; N, 14.73. Found: C, 58.99; H, 3.93; N, 14.68.

*Step F: Preparation of (3 - amino-6-benzylmercapto-* pyrazinoyl)guanidine.—Guanidine hydrochloride (5.0 g., 0.052 mole) is added to a solution of sodium (1.0 g., 0.043 g. atom) in 2-propanol (30 ml.) 2-methyl-6-benzylmercapto - 4 - H-pyrazino[2,3-d][1,3]oxazin-4-one (3.4 g., 0.012 mole) is added and the mixture allowed to stand 1 hour at room temperature. The mixture then is poured into water (100 ml.) and the mixture is acidified with hydrochloric acid to dissolve and deacetylate the gummy product which precipitates. The solution is made basic to precipitate the product which is recrystallized from aqueous 2-propanol to yield 1.1 g. of 3-amino-6-benzylmercaptopyrazinoyl)quanidine, M.P. 171–173° C. (dec.).

*Analysis.*—Calculated for $C_{13}H_{14}N_6OS$: C, 51.64; H, 4.67; N, 27.80. Found: C, 51.85; H, 4.82; N, 27.62.

EXAMPLE 86

*(3-acetamido-6-methylmercaptopyrazinoyl) guanidine*

*Step A: Preparation of 4-hydroxy-6-methylmercaptopteridine.*—Methyl mercaptan (4.8 g., 0.1 mole) is dissolved in a 10% sodium hydroxide solution (60 ml.), and added to a solution of 4-hydroxy-6-chloropteridine from Example 85, Step B, (9.1 g., 0.05 mole) in a 4% sodium hydroxide solution (100 ml.). The resulting solution is heated 20 minutes on the steam bath, and then chilled to precipitate the sodium salt of the product. The salt is collected, dissolved in hot water and the solution acidified to precipitate the product which is recrystallized from aqueous 2-propanol to yield 3.5 g. of 4-hydroxy-6-methylmercaptopteridine M.P. 289.5–291.5° C.

*Step B: 3-amino-6-methylmercaptopyrazinoic acid.*—A solution of 4-hydroxy-6-methylmercaptopteridine (25.5 g., 0.13 mole) in 5% sodium hydroxide solution (250 ml.) is heated 12 hours on the steam bath, and then chilled to precipitate the sodium salt of the product. The salt is collected, dissolved in hot water and the solution acidified to precipitate the product which is crystallized from ethyl acetate to yield 7.1 g. of 3-amino-6-methylmercaptopyrazinoic acid, M.P. 182–184° C. (dec.).

*Analysis.*—Calculated for $C_6H_7N_3O_2S$: C, 38.91; H, 3.81. Found: C, 39.58; H, 3.98.

*Step C: Preparation of 2-methyl-6-methylmercapto-4-H-pyrazino[2,3-d][1,3]oxazin-4-one.*—A solution of 3-amino-6-methylmercaptopyrazinoic acid (3.0 g., 0.016 mole) in acetic anhydride (15 ml.) is heated 2 hours on the steam bath, and then cooled. The product which separates is recrystallized from benzene to yield 2.5 g. of 2 - methyl - 6-methylmercapto-4-H-pyrazino[2,3-d][1,3] oxazin-4-one, M.P. 189–191° C.

*Analysis.*—Calculated for $C_8H_7N_3O_2S$: C, 45.92; H, 3.37; N, 20.08. Found: C, 46.11; H, 3.42; N, 20.04.

*Step D: Preparation of (3-acetamido-6-methylmercaptopyrazinoyl)guanidine.*—Guanidine hydrochloride (5.0 g., 0.052 mole) is added to a solution of 1.0 g. (0.043 g.-atom) of sodium in 30 ml. of 2-propanol. 2-methyl-6-methylmercapto - 4-H-pyrazino[2,3-d][1,3]oxazin-4-one (2.1 g., 0.01 mole) is added and the mixture stirred 1.5 hours at room temperature. The mixture is then poured into 100 ml. of water and the product that precipitates is removed by filtration. The product is dissolved in dilute hydrochloric acid and then reprecipitated by addition of dilute sodium hydroxide yielding 68% of (3-acetamido-6-methylmercaptopyrazinoyl)guanidine, M.P. 220–222° C.

*Analysis.*—Calculated for $C_9H_{12}N_6O_2S$: C, 40.29; H, 4.51; N, 31.33. Found: C, 39.90; H, 4.39; N, 31.39.

EXAMPLE 87

*(3-amino-6-methylmercaptopyrazinoyl)guanidine*

(3 - acetamido-6-methylmercaptopyrazinoyl)guanidine, from Example 86, is added to water and the mixture acidified with hydrochloric acid to dissolve and then deacetylate the product. Upon making the solution basic with dilute sodium hydroxide, the product precipitates and is collected by filtration giving an 86% yield of (3-amino-6-methylmercaptopyrazinoyl)-guanidine, M.P. 203–205° C.

*Analysis.*—Calculated for $C_7H_{10}N_6OS$: C, 37.16; H, 4.45; N, 37.15. Found: C, 37.43; H, 4.51; N, 37.06.

EXAMPLE 88

*(3-amino-6-methylsulfonylpyrazinoyl)guanidine*

*Step A: Preparation of 3-amino-6-methylsulfonylpyrazinoic acid.*—A solution of potassium permanganate (1.05 g., 0.0067 mole) in water (35 ml.) is added to a solution of 3-amino-6-methylmercaptopyrazinoic acid, from Example 86, Step B, (0.92 g., 0.005 mole) in a 2.5% sodium hydroxide solution (15 ml.). Manganese dioxide is filtered off and the filtrate acidified to precipitate the product which is recrystallized from 2-propanol to yield 0.5 g., of 3-amino-6-methylsulfonylpyrazinoic acid, M.P. 239–242° C. (dec.).

*Analysis.*—Calculated for $C_6H_7N_3O_4S$: C, 33.18; H, 3.25; N, 19.35. Found: C, 33.81; H, 3.35; N, 18.88.

*Step B: Preparation of 2-methyl-6-methylsulfonyl-4-H-pyrazino[2,3-d][1,3]oxazin-4-one.*—A solution of 3-amino-6-methylsulfonylpyrazinoic acid (2.2 g., 0.01 mole) in acetic anhydride (25 ml.) is heated 5 hours on the steam bath, cooled and the precipitated product recrystallized from acetone to obtain 0.8 g. of 2-methyl-6-methylsulfonyl-4-H-pyrazino[2,3-d][1,3]oxazin-4-one, M.P. 214–216° C.

*Analysis.*—Calculated for $C_8H_7N_3O_4S$: C, 39.83; H, 2.93; N, 17.42. Found: C, 40.23; H, 2.92; N, 17.27.

*Step C: Preparation of (3-amino-6-methylsulfonylpyrazinoyl)guanidine.*—This product is prepared by essentially the same procedure described in Example 85, Step F, with the exception that an equimolecular quantity of 2-methyl-6 - methylsulfonyl-4-H-pyrazino[2,3-d][1,3]oxazin-4-one is employed in place of the oxazine used in Step F of Example 85. There is thus obtained a 27% yield of (3-amino-6-methylsulfonylpyrazinoyl)-guanidine, which, after recrystallization from a mixture of 2-propanol and water melts at 224–226° C. (dec.).

*Analysis.*—Calculated for $C_7H_{10}N_6O_3S$: C, 32.55; H, 3.90; N, 32.54. Found: C, 32.82; H, 3.70; N, 32.19.

Other (3,5-diamino-6-chloropyrazinoyl)guanidine compounds that can be prepared by substantially the same process described in Example 79 are identified in Table II. In each instance the methyl 3-amino-5-dimethylamino-6-chloropyrazinoate employed in Example 79 is replaced by the pyrazinoic acid ester identified in the table which is reacted with guanidine by substantially the same method described in Example 79 to give the pyrazinoylguanidine which also is identified in Table II.

The radicals R, $R^1$, X and Y in the starting pyrazinoate in each case where mentioned are retained in the pyrazinoylguanidine end product and are identified in columns 2 and 3 of Table II. While the pyrazinoic acid ester and guanidine reactants are generally employed in the same molecular proportions used in Example 79, this ratio is not critical and can be varied over a rather broad range. The reagents, time of heating on the steam bath, crystallization solvent, yield, melting point and elementary analysis of each product are given in Table II. All other conditions of the reaction essentially are as described in Example 79.

3,313,813

TABLE II

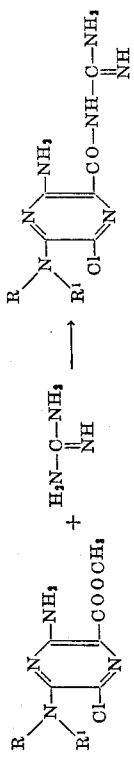

| Ex. No. | R | R¹ | Pyrazinoate from Ex. No. | Min. on Steam Bath | Crystallization Solvent | Yield, Percent | M.P., °C. | Empirical Formula | | Analysis | | | |
|---|---|---|---|---|---|---|---|---|---|---|---|---|---|
| | | | | | | | | | | C | H | N | Cl |
| 89 | H | H | 1 | | | 93 | 240.5–241.5 | $C_6H_8ClN_7O$ | Calc. | 31.38 | 3.51 | 42.70 | 15.44 |
| | | | | | | | | | Found | 31.59 | 3.43 | 42.85 | 15.42 |
| | | | | | | | | $C_6H_9ClN_7O·HCl^1$ | Calc. | 27.08 | 3.41 | 36.84 | 26.65 |
| | | | | | | | 208.5 | | Found | 27.54 | 3.35 | 36.88 | 26.03 |
| 90 | $CH_3$ | H | 34 | 10 | $HCl^2$ NaOH | 89 | 238–239 | $C_7H_{10}ClN_7O$ | Calc. | 34.50 | 4.14 | 40.24 | 14.56 |
| | | | | | | | | | Found | 34.19 | 4.28 | 39.02 | 14.55 |
| 91 | $C_2H_5$ | H | 35 | 3 | $HCl^2$ NaOH | 63 | 217–218 | $C_8H_{12}ClN_7O$ | Calc. | 37.29 | 4.69 | 38.05 | 13.76 |
| | | | | | | | | | Found | 37.35 | 4.73 | 38.05 | 13.76 |
| 92 | $CH_3(CH_2)_2$ | H | 36 | 1 | Methanol-water | 93 | 221–222 | $C_9H_{14}ClN_7O$ | Calc. | 39.78 | 5.19 | 36.09 | 13.05 |
| | | | | | | | | | Found | 39.75 | 5.28 | 35.89 | 13.05 |
| 93 | $(CH_3)_2CH$ | H | 37 | 1 | do | 75 | 215 | $C_9H_{14}ClN_7O$ | Calc. | 39.78 | 5.19 | 36.09 | 13.05 |
| | | | | | | | | | Found | 39.80 | 5.13 | 35.77 | 12.97 |
| 94 | $CH_2=CH-CH_2$ | H | 38 | 1 | 2-propanol | 84 | 213–214 | $C_9H_{12}ClN_7O$ | Calc. | 40.41 | 4.48 | 36.36 | 13.15 |
| | | | | | | | | | Found | 40.11 | 4.44 | 36.07 | 13.25 |
| 95 | $CH_3(CH_2)_3$ | H | 39 | 1 | 2-propanol | 65 | 219.5 | $C_{10}H_{16}ClN_7O$ | Calc. | 42.03 | 5.64 | 34.32 | 12.47 |
| | | | | | | | | | Found | 42.26 | 5.65 | 33.95 | 12.41 |
| 96 | $CH_3CH_2CH(CH_3)$ | H | 40 | 10 | Methanol-water | 74 | 208–209 | $C_{10}H_{16}ClN_7O$ | Calc. | 42.03 | 5.64 | 34.32 | 12.40 |
| | | | | | | | | | Found | 42.02 | 5.64 | 34.16 | 12.40 |
| 97 | $(CH_3)_2CHCH_2$ | H | 41 | 1 | do | 76 | 221 | $C_{10}H_{16}ClN_7O$ | Calc. | 42.03 | 5.64 | 34.32 | 12.41 |
| | | | | | | | | | Found | 41.81 | 5.31 | 34.32 | 12.35 |
| 98 | $(CH_3)_3C$ | H | 42 | 120 | Methanol-water | 84 | 222–223 | $C_{10}H_{16}ClN_7O$ | Calc. | 42.03 | 5.64 | 34.32 | 12.41 |
| | | | | | | | | | Found | 42.20 | 5.59 | 34.00 | 12.27 |
| 99 | $CH_3(CH_2)_4$ | H | 43 | 1 | 2-propanol | 70 | 215–216 | $C_{11}H_{18}ClN_7O$ | Calc. | 44.07 | 6.05 | 32.70 | 11.83 |
| | | | | | | | | | Found | 44.01 | 5.88 | 32.66 | 11.85 |
| 100 | $CH_3CH_2CH_2CH$ with $CH_3$ branch | H | 44 | 0 | do | 89 | 186.5–188.5 | $C_{11}H_{18}ClN_7O$ | Calc. | 44.07 | 6.05 | 32.70 | 11.83 |
| | | | | | | | | | Found | 44.34 | 5.81 | 32.41 | 11.75 |
| 101 | $(C_2H_5)_2CH$ | H | 45 | 0 | do | 82 | 209–211 | $C_{11}H_{18}ClN_7O$ | Calc. | 44.07 | 6.05 | 32.70 | 11.83 |
| | | | | | | | | | Found | 44.07 | 5.95 | 32.59 | 11.81 |
| 102 | $CH_3(CH_2)_5$ | H | 46 | 1 | Methanol-water | 100 | 194.5–196.5 | $C_{12}H_{20}ClN_7O$ | Calc. | 45.93 | 6.42 | 31.25 | 11.30 |
| | | | | | | | | | Found | 45.95 | 6.42 | 31.03 | 11.20 |
| 103 | cyclopropyl-$CH_2$ (?) | H | 47 | 5 | do | 95 | 220–221.5 | $C_{10}H_{14}ClN_7O$ | Calc. | 42.33 | 4.97 | 34.56 | 12.50 |
| | | | | | | | | | Found | 42.57 | 5.14 | 34.47 | 12.75 |
| 104 | cyclopropyl | H | 48 | 2 | $HCl^2$ NaOH | 85 | 213–215 | $C_9H_{12}ClN_7O$ | Calc. | 40.08 | 4.48 | 36.36 | 13.16 |
| | | | | | | | | | Found | 40.24 | 4.43 | 36.34 | 13.31 |
| 105 | cyclopentyl (H) | H | 49 | 0 | Acetic ₂-acid NaOH | 65 | 219–220 | $C_{11}H_{16}ClN_7O$ | Calc. | 44.37 | 5.42 | 32.93 | 11.91 |
| | | | | | | | | | Found | 44.36 | 5.54 | 33.01 | 11.97 |
| 106 | phenyl-$CH_3$ | H | 50 | 40 | $HCl$ 2-propanol NaOH¹ | 44 | 206–209 | $C_{13}H_{14}ClN_7O$ | Calc. | 48.83 | 4.41 | 30.67 | |
| | | | | | | | | | Found | 48.83 | 4.49 | 30.44 | |
| 107 | $CH_3$-phenyl-$CH_2$ | $CH_3$ | 51 | 3 | Acetonitrile | 57 | 216–217 | $C_{14}H_{16}ClN_7O$ | Calc. | 50.37 | 4.83 | 29.38 | ¹0.62 |
| | | | | | | | | | Found | 50.16 | 4.77 | 29.31 | 10.58 |

See footnotes at end of table.

TABLE II—Continued

| Ex. No. | R | R¹ | Pyrazinoate from Ex. No. | Min. on Steam Bath | Crystallization Solvent | Yield, Percent | M.P., °C.[4] | End Product Empirical Formula | | Analysis | | | |
|---|---|---|---|---|---|---|---|---|---|---|---|---|---|
| | | | | | | | | | | C | H | N | Cl |
| 108 | F-C₆H₄-CH₂ | H | 52 | 5 | ...do... | 100 | 206–208 | $C_{13}H_{13}ClFN_7O$ | Calc. Found | 46.22 46.40 | 3.38 3.82 | 29.03 28.82 | 10.50 10.40 |
| 109 | Cl-C₆H₄-CH₂ | H | 53 | 1 | HCl [2] NaOH | 96 | 225–226 | $C_{13}H_{13}Cl_2N_7O$ | Calc. Found | 44.08 44.01 | 3.70 3.95 | 27.68 27.69 | 20.02 20.10 |
| 110 | C₆H₅-CH₂CH₂ | H | 54 | 10 | 2-propanol water | 57 | 199–202 | $C_{14}H_{16}ClN_7O \cdot HCl$ | Calc. Found | 45.41 45.20 | 4.63 4.71 | 26.48 25.94 | |
| 111 | CF₃CH₂ | H | 55 | 1 | Acetonitrile | 77 | 232–233 | $C_8H_9N_7ClF_3O$ | Calc. Found | 30.83 30.82 | 2.91 3.13 | 31.46 31.27 | 11.38 11.26 |
| 112 | CF₃CH₂CH₂ | H | 56 | 5 | ...do... | 65 | 221–222.5 | $C_9H_{11}N_7ClF_3O$ | Calc. Found | 33.19 33.57 | 3.40 3.64 | 30.11 29.92 | 10.89 10.86 |
| 113 | HOCH₂CH₂ | H | 57 | 1 | Aq. HCl | 63 | 272–273 | $C_8H_{12}ClN_7O_2 \cdot HCl$ | Calc. Found | 30.98 31.40 | 3.90 4.30 | 31.61 31.38 | 22.86 22.61 |
| 114 | OH OH CH₂(CH)₄CH₂ | H | 58 | 5 | ...do... | 68 | 223–224 | $C_{11}H_{20}ClN_7O_4$ | Calc. Found | 36.59 36.54 | 5.12 5.15 | 24.90 24.34 | 9.00 9.01 |
| 115 | NH₂CH₂CH₂ | H | 59 | 3 | H₂O-acetone | 68 | 311 | $C_8H_{13}ClN_8O \cdot 2HCl$ | Calc. Found | 27.80 27.84 | 4.37 4.58 | 32.42 31.88 | |
| 116 | (CH₃)₂NCH₂CH₂ | H | 60 | 1 | HCl [2] NaOH | 98 | 192.5–194.5 | $C_{10}H_{17}ClN_8O$ | Calc. Found | 39.93 39.83 | 5.70 5.72 | 37.26 37.63 | 11.79 11.65 |
| 117 | pyridyl-CH₂ | H | 61 | 5 | DMF [3] | 64 | 239–240 | $C_{12}H_{13}ClN_8O$ | Calc. Found | 44.93 44.62 | 4.09 4.09 | 34.94 32.61 | |
| 118 | furfuryl | H | 62 | 5 | Ethanol | 92 | 217–218 | $C_{11}H_{12}ClN_7O_2$ | Calc. Found | 42.65 42.80 | 3.91 3.89 | 31.66 31.37 | 11.45 11.50 |
| 119 | C₆H₅-CH₂ | H | 4 | 3 | ...do... | 95 | 246.5–248.5 | $C_{12}H_{12}ClN_7O$ | Calc. Found | 47.15 47.13 | 3.96 4.09 | 32.07 31.65 | 11.60 11.70 |
| 120 | Cl-C₆H₄ | H | 5 | 5 | CH₃SO₃H [2] NaOH | 95 | 276–278 | $C_{11}H_{10}Cl_2N_7O$ | Calc. Found | 42.36 42.08 | 3.26 3.48 | 28.82 28.23 | 20.85 20.32 |
| 121 | CH₃ | C₂H₅ | 63 | 1 | HCl [2] NaOH | 92 | 229–230 | $C_6H_{10}Cl_2N_7O$ | Calc. Found | 39.78 39.99 | 5.19 5.18 | 36.09 35.83 | 13.05 13.15 |
| 122 | CH₃ | CH₃(CH₂)₂ | 64 | 5 | Methanol water | 97 | 214–215 | $C_{10}H_{14}ClN_7O$ | Calc. Found | 42.03 42.31 | 5.64 5.94 | 34.32 34.40 | 12.41 12.56 |
| 123 | CH₃ | (CH₃)₂CH | 65 | 5 | ...do... | 70 | 207–208 | $C_{10}H_{14}ClN_7O$ | Calc. Found | 42.03 42.40 | 5.64 5.64 | 34.32 34.32 | 12.41 12.45 |
| 124 | CH₃ | CH₂=CHCH₂ | 66 | 5 | ...do... | 95 | 207–208 | $C_{10}H_{14}ClN_7O$ | Calc. Found | 42.33 42.59 | 5.70 4.97 | 34.56 34.17 | 12.50 12.38 |
| 125 | CH₃ | CH₃(CH₂)₃ | 67 | 5 | ...do... | 95 | 208–209 | $C_{11}H_{16}ClN_7O$ | Calc. Found | 44.34 44.07 | 4.92 6.08 | 32.38 32.70 | 11.83 11.94 |
| 126 | C₂H₅ | C₂H₅ | 68 | 1 | ...do... | 75 | 215 | $C_{10}H_{16}ClN_7O$ | Calc. Found | 42.03 42.00 | 5.64 5.52 | 34.32 34.14 | 12.21 12.41 |
| 127 | C₂H₅ | CH₃(CH₂)₂ | 69 | 0 | Acetonitrile | 92 | 224–225 | $C_{11}H_{18}ClN_7O$ | Calc. Found | 44.25 44.07 | 6.03 6.05 | 32.70 32.63 | 11.83 11.83 |
| 128 | C₂H₅ | (CH₃)₂CH | 70 | 0 | ...do... | 75 | 207–208 | $C_{11}H_{18}ClN_7O$ | Calc. Found | 44.07 43.91 | 6.05 5.82 | 32.70 32.59 | 11.83 11.68 |

See footnotes at end of table.

TABLE II—Continued

| Ex. No. | R | R' | Pyrazinoate from Ex. No. | Min. on Steam Bath | Crystallization Solvent | Yield, Percent | M.P., °C.[4] | Empirical Formula | End Product Analysis | | | |
|---|---|---|---|---|---|---|---|---|---|---|---|---|
| | | | | | | | | | | C | H | N | Cl |
| 129 | C₂H₅ | CH₂=CHCH₂ | 71 | 0 | 2-propanol H₂O | 92 | 208–209 | C₁₁H₁₆ClN₇O | Calc. | 44.37 | 5.42 | 32.93 | 11.91 |
| | | | | | | | | | Found | 44.51 | 5.43 | 32.58 | 11.84 |
| 130 | C₂H₅ | CH₃(CH₂)₃ | 72 | 5 | 2-propanol | 98 | 200.5–201.5 | C₁₂H₂₀ClN₇O | Calc. | 45.93 | 6.42 | 31.25 | 11.30 |
| | | | | | | | | | Found | 46.06 | 6.49 | 31.02 | 11.34 |
| 131 | CH₃(CH₂)₂ | CH₃(CH₂)₃ | 73 | 1 | HCl²NaOH | 100 | 221–222 | C₁₂H₂₀ClN₇O | Calc. | 45.93 | 6.42 | 31.25 | |
| | | | | | | | | | Found | 46.03 | 6.37 | 30.73 | 10.82 |
| 132 | CH₃(CH₂)₂ | CH₃(CH₂)₃ | 74 | 0 | 2-propanol | 84 | 215–217 | C₁₃H₂₂ClN₇O | Calc. | 47.62 | 6.76 | 29.91 | 10.93 |
| | | | | | | | | | Found | 47.60 | 6.77 | 29.44 | |
| 133 | 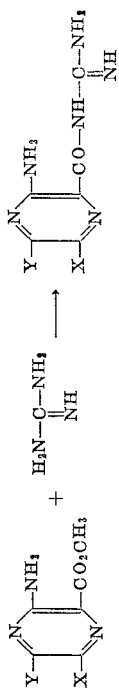 | | 75 | 1 | HCl²NaOH | 90 | 244.5–245.5 | C₁₀H₁₄ClN₇O | Calc. | 42.33 | 4.97 | 34.56 | 12.50 |
| | | | | | | | | | Found | 42.34 | 4.87 | 34.11 | 12.71 |
| 134 | | | 76 | 1 | Ethanol | 49 | 224–225 | C₁₂H₁₈ClN₇O | Calc. | 46.22 | 5.82 | 31.45 | 11.37 |
| | | | | | | | | | Found | 46.55 | 5.85 | 31.42 | 11.18 |
| 135 | | | 77 | 5 | Aq. HCl | 74 | 299–300 | C₁₁H₁₇ClN₈O·2HCl | Calc. | 34.25 | 4.97 | 29.05 | 27.58 |
| | | | | | | | | | Found | 33.91 | 5.08 | 29.45 | 27.09 |
| 136 | CH₃ | NH₂ | 78 | 0 | HCl²NaOH | 92 | 234 | C₇H₁₁ClN₈O | Calc. | 32.50 | 4.29 | 43.32 | 13.71 |
| | | | | | | | | | Found | 32.85 | 4.65 | 42.08 | 13.88 |

$$\underset{CO_2CH_3}{\underset{X}{\overset{Y}{\bigcirc}}\overset{NH_2}{}} + H_2N-\underset{NH}{\overset{}{C}}-NH_2 \longrightarrow \underset{X}{\underset{}{\overset{Y}{\bigcirc}}}CO-NH-\underset{NH}{\overset{}{C}}-NH_2$$

| Ex. No. | X | Y | Pyrazinoate from Ex. No. | Min. on Steam Bath | Crystallization Solvent | Yield, Percent | M.P., °C. | Empirical Formula | End Product Analysis | | | |
|---|---|---|---|---|---|---|---|---|---|---|---|---|
| | | | | | | | | | | C | H | N | Cl |
| 137 | H | HO | 7 | 60 | H₂O | 10 | [4]>310 | C₅H₆N₆O₂·HCl | Calc. | 30.98 | 3.90 | 36.13 | |
| | | | | | | | | | Found | 31.07 | 3.87 | 35.93 | |
| 138 | H | H₂N | 8 | 15 | H₂O | 8 | [4]286–288 | C₅H₇N₇O·HCl | Calc. | 31.11 | 4.36 | 42.33 | |
| | | | | | | | | | Found | 31.64 | 4.42 | 42.22 | |
| 139 | H | (CH₃)₂N | 9 | 20 | 2-propanol H₂O | 45 | [4]224–225 | C₈H₁₃N₇O | Calc. | 43.04 | 5.87 | 43.93 | |
| | | | | | | | | | Found | 43.18 | 5.73 | 43.63 | |
| 140 | H | CH₃O | 10 | 30 | H₂O | 52 | [4]229–230 | C₇H₁₀N₆O·HCl | Calc. | 34.08 | 4.49 | 34.08 | |
| | | | | | | | | | Found | 34.09 | 4.71 | 33.80 | |
| 141 | H | C₆H₅CH₂NH | 11 | 20 | H₂O | 56 | [4]231–233 | C₁₃H₁₅N₇O·HCl | Calc. | 48.52 | 5.01 | 30.47 | |
| | | | | | | | | | Found | 48.68 | 5.04 | 30.48 | |
| 142 | Cl | CH₃O | 12 | 10 | Dil. HCl | 90 | 257 | C₆H₆ClN₆O₂·HCl | Calc. | 29.91 | 3.59 | 29.94 | 25.23 |
| | | | | | | | | | Found | 30.18 | 3.51 | 29.90 | 25.10 |
| 143 | Cl | CH₃—S | 13 | 2 | DMF-H₂O | 100 | 234.5–236.5 | C₇H₆ClN₆OS | Calc. | 32.85 | 3.48 | 31.82 | 13.60 |
| | | | | | | | | | Found | 32.25 | 3.47 | 31.25 | 13.72 |
| 144 | Cl | HO | 7, Step C | 60 | H₂O | 24 | [4]>300 | C₆H₇ClN₆O₂·HCl | Calc. | 26.98 | 3.02 | 31.47 | |
| | | | | | | | | | Found | 27.57 | 2.98 | 31.25 | |
| 145 | Cl | HS | 14 | 2 | Dil. HCl²dil. NaOH | 100 | 236.5 | C₆H₇ClN₆OS | Calc. | 29.21 | 2.86 | 34.07 | 14.37 |
| | | | | | | | | | Found | 29.38 | 2.79 | 34.42 | 14.46 |
| 146 | Cl | C₂H₅O | 15 | 10 | Dil. HCl²dil. NaOH | 81 | 215–216 | C₈H₁₁ClN₆O | Calc. | 37.15 | 4.29 | 32.49 | 13.71 |
| | | | | | | | | | Found | 36.96 | 4.31 | 32.12 | 13.79 |

See footnotes at end of table.

TABLE II—Continued

| Ex. No. | X | Y | Pyrazinoate from Ex. No. | Min. on Steam Bath | Crystallization Solvent | Yield, Percent | M.P., °C.[4] | Empirical Formula | End Product | | Analysis | | | |
|---|---|---|---|---|---|---|---|---|---|---|---|---|---|---|
| | | | | | | | | | | | C | H | N | Cl |
| 147 | Cl | Cl | 1, Step A | 15 | Dil. HCl | 72 | 259–261 | C₆H₄Cl₂N₆O·HCl | Calc | | 25.24 | 2.47 | 29.43 | 37.25 |
| | | | | | | | | | Found | | 25.50 | 2.91 | 29.17 | 36.35 |
| 148 | CH₃ | H | 16 | 10 | Dil. HCl [2]-Dil. NaOH | 87 | [4]218–219 | C₇H₁₀N₆O | Calc | | 43.29 | 5.19 | 43.28 | |
| | | | | | | | | | Found | | 43.50 | 5.07 | 43.25 | |
| 149 | CH₃ | (CH₃)₂N | 17 | 20 | 2-propanol | 42 | [4]262 | C₉H₁₅N₇O·2 HCl | Calc | | 34.85 | 5.53 | 31.61 | |
| | | | | | | | | | Found | | 34.34 | 5.50 | 31.38 | |
| 150 | H | CH₃ | 18 | 5 | Ethanol | 13 | [4]210 | C₇H₁₀N₆O | Calc | | 43.29 | 5.19 | 43.28 | |
| | | | | | | | | | Found | | 43.50 | 5.28 | 43.50 | |
| 151 | CH₃ | CH₃ | Known | 20 | CH₃CN–H₂O | 38 | [4]245 | C₈H₁₂N₆O | Calc | | 46.14 | 5.81 | 40.37 | |
| | | | | | | | | | Found | | 45.90 | 5.98 | 40.37 | |
| 152 | Br | CH₃ | 19 | 20 | 2-propanol H₂O | 35 | [4]288 | C₇H₉BrN₆O·HCl | Calc | | 27.31 | 3.26 | 26.89 | |
| | | | | | | | | | Found | | 27.16 | 3.32 | 26.89 | |
| 153 | C₂H₅ | H | 20 | 20 | | 53 | [4]207.5–209.5 | C₈H₁₂N₆O | Calc | | 46.14 | 5.81 | 40.36 | |
| | | | | | | | | | Found | | 46.47 | 5.67 | 40.34 | |
| 154 | H | ⬡H | 21 | 20 | Dil.HCl [2]-dil. NaOH | 71 | [4]221–222 | C₁₂H₁₂N₆O | Calc | | 54.94 | 6.92 | 32.04 | |
| | | | | | | | | | Found | | 55.04 | 6.68 | 31.54 | |
| 155 | ⬡H | H | 22 | 20 | Dil. HCl [2]-dil. NaOH | 61 | [4]228–230 | C₁₂H₁₈N₆O | Calc | | 54.94 | 6.92 | 32.04 | |
| | | | | | | | | | Found | | 55.25 | 6.83 | 31.78 | |
| 156 | △H | H | 23 | 20 | Dil. HCl [2]-dil. NaOH | 61 | [4]196.5–199 | C₉H₁₂N₆O | Calc | | 49.08 | 5.49 | 38.16 | |
| | | | | | | | | | Found | | 49.35 | 5.49 | 37.94 | |
| 157 | H | C₆H₅ | 24 | 20 | CH₃CN–H₂O | 51 | [4]224–226 | C₁₂H₁₂N₆O | Calc | | 56.24 | 4.72 | 32.80 | |
| | | | | | | | | | Found | | 56.50 | 5.01 | 32.44 | |
| 158 | C₆H₅ | H | 25 | 20 | 2-propanol H₂O | 34 | [4]194.5–195.5 | C₁₂H₁₂N₆O | Calc | | 56.24 | 4.72 | 32.80 | |
| | | | | | | | | | Found | | 56.63 | 5.03 | 32.99 | |
| 159 | C₆H₅ | C₆H₅ | Known | 10 | | 87 | 234.5–235.5 | C₁₈H₁₆N₆O | Calc | | 65.04 | 4.85 | 25.29 | |
| | | | | | | | | | Found | | 64.59 | 4.62 | 24.88 | |
| 160 | C₆H₅ | Cl | 26 | 15 | Dil. HCl [2]-dil. NaOH | 69 | [4]214–216 | C₁₂H₁₁ClN₆O | Calc | | 49.57 | 3.81 | 28.91 | |
| | | | | | | | | | Found | | 49.31 | 3.74 | 28.60 | |
| 161 | Br | C₆H₅ | 27 | 15 | Dil. HCl [2]-dil. NaOH | 66 | [4]234–236 | C₁₂H₁₁BrN₆O | Calc | | 43.00 | 3.31 | 25.08 | |
| | | | | | | | | | Found | | 42.86 | 3.38 | 24.84 | |
| 162 | 4-Cl-C₆H₄ | H | 28 | 10 | 2-propanol H₂O | 70 | [4]282–285 | C₁₂H₁₁ClN₆O | Calc | | 43.74 | 3.70 | 25.69 | |
| | | | | | | | | | Found | | 44.05 | 3.79 | 25.31 | |
| 163 | CH₃ (or C₆H₅) | C₆H₅ (or CH₃) | 29 | 5 | Dil. HCl [2]-dil. NaOH | 77 | [4]212–213 | C₁₃H₁₄N₆O | Calc | | 57.77 | 5.22 | 31.09 | |
| | | | | | | | | | Found | | 58.08 | 5.33 | 31.32 | |
| 164 | C₆H₅ (or CH₃) | CH₃ (or C₆H₅) | 29 | 5 | Dil. HCl [2]-dil. NaOH | 90 | [4]218–219 | C₁₃H₁₄N₆O | Calc | | 57.77 | 5.22 | 31.09 | |
| | | | | | | | | | Found | | 57.04 | 5.06 | 30.73 | |
| 165 | C₆H₅ | (CH₃)₂N | 30 | 20 | 2-propanol H₂O | 40 | [4]205–206 | C₁₄H₁₇N₇O | Calc | | 56.17 | 5.73 | 32.76 | |
| | | | | | | | | | Found | | 56.52 | 5.82 | 32.52 | |
| 166 | —(CH₂)₄— | | 32 | 10 | Dil. HCl [2]-dil. NaOH | 29 | 220–221 | C₁₀H₁₄N₆O | Calc | | 51.27 | 6.02 | 35.88 | |
| | | | | | | | | | Found | | 50.79 | 6.15 | 35.33 | |
| 167 | —CH=CH—CH=CH— | | Known | 15 | | 56 | 211–213 | C₁₀H₁₀N₆O | Calc | | 52.16 | 4.38 | 36.50 | |
| | | | | | | | | | Found | | 52.58 | 4.49 | 36.49 | |
| 168 | | ⬡Cl | 33 | 10 | | 70 | [4]246–247 | C₁₀H₉ClN₆O | Calc | | 45.38 | 3.43 | 31.75 | |
| | | | | | | | | | Found | | 45.34 | 3.60 | 31.39 | |

[1] This compound is the hydrochloride of (3,5-diamino-6-chloropyrazinoyl) guanidine.
[2] Purified by dissolving in a dilute solution of the specified acid and precipitating by the addition of sodium hydroxide solution.
[3] DMF is dimethyl formamide.
[4] Means decomposition.
[5] 1-Pyrrolidinyl radical.
[6] Hexahydro-1-azepinyl radical.
[7] 4-Methyl-1-piperazinyl radical.

The following examples illustrate methods for preparing the 1-pyrazinoyl-3-substituted-guanidine compounds of this invention. Example 172 specifically illustrates a generally useful method for preparing compounds of this type, particularly for making the 1-pyrazinoyl-3-monosubstituted products of this invention, and Example 191 illustrates a method particularly useful for making the 1-pyrazinoyl-3,3-disubstituted-guanidine compounds of this invention.

EXAMPLE 169

*1-(3,5-diamino-6-chloropyrazinoyl)-3-(2-hydroxyethyl) guanidine hydrochloride*

*Step A: Preparation of (2-hydroxyethyl)guanidine sulfate.*—A solution of 13.9 g. (0.05 mole) of 2-methyl-2-pseudothiuronium sulfate and 9.2 g. (0.15 mole) of ethanolamine in 40 ml. of water is heated 20 minutes on the steam bath. The solution is evaporated to dryness in vacuo and the syrupy residue stirred with ethanol to give a crystalline product. After recrystallization from aqueous ethanol there is obtained 12.5 g. of (2-hydroxyethyl)guanidine sulfate, M.P. 127.5–135.5 C. (hygoscopic).

*Analysis.*—Calculated for $(C_3H_{10}N_3O)_2SO_4$: C, 23.68; H, 6.63; N, 27.62. Found: C, 23.91; H, 6.48; N, 27.39.

*Step B: Preparation of 1-(3,5-diamino-6-chloropyrazinoyl) - 3 - (2-hydroxyethyl)guanidine hydrochloride.*—(2-hydroxyethyl)guanidine sulfate (15.2 g., 0.05 mole) is added to a solution of (2 g., 0.087 g./atom) of sodium in 25 ml. of methanol. The mixture is concentrated to a syrup by vacuum distillation, 4.1 g. (0.02 mole) of methyl 3,5-diamino-6-chloropyrazinoate (from Example 1, Step B), is added and the mixture heated 5 minutes on the steam bath. Ice water is added, the solid product collected and converted to the hydrochloride salt by dissolving in warm water to which solution concentrated hydrochloric acid is added. The precipitated hydrochloride salt is recrystallized four times from aqueous isopropyl alcohol to give 1.2 g. of 1-(3,5-diamino-6-chloropyrazinoyl) - 3 - (2-hydroxyethyl)guanidine hydrochloride, M.P. 228.5–229.5° C. (dec.).

*Analysis.*—Calculated for $C_6H_{12}ClN_7O_2 \cdot HCl$: C, 30.98; H, 4.22; N, 31.61. Found: C, 30.56; H, 4.51; N, 31.56.

EXAMPLE 170

*1-(3-amino-5-isopropylamino-6-chloropyrazinoyl)-3-(2-hydroxyethyl)guanidine hydrochloride hemihydrate*

This compound is prepared by essentially the same method described in Example 169, Step B, except that methyl 3-amino-5-isopropylamino - 6 - chloropyrazinoate (from Example 37) is used in place of methyl 3,5-diamino-6-chloropyrazinoate used in Example 169, Step B. The product, 1-(3-amino-5-isopropylamino-6-chloropyrazinoyl)-3-(2 - hydroxyethyl)guanidine hydrochloride hemihydrate, melts at 185–186° C. (dec.).

*Analysis.*—Calculated for $C_{11}H_{18}ClNO_2$: $HCl \cdot \frac{1}{2}H_2O$ C, 36.57; H, 5.58; N, 27.15. Found: C, 36.55; H, 5.28; N, 27.23.

EXAMPLE 171

*1-(3,5-diamino-6-chloropyrazinoyl)-3-phenylguanidinium methanesulfonate*

A mixture of 6.1 g. (0.03 mole) of methyl 3,5-diamino-6-chloropyrazinoate (from Example 1, Step B), 6.8 g. (0.05 mole) of phenylguanidine and 3 ml. of isopropyl alcohol is heated on the steam bath for 6 hours. Water (50 ml.) is added and the solid material is collected. The solids are treated with a warm solution of 5 ml. of methanesulfonic acid in 300 ml. of water. A small amount of insoluble material is filtered off. The filtrate is cooled and treated with 10 ml. of methanesulfonic acid to cause the methanesulfonic acid salt of the product to precipitate. The salt is recrystallized twice from water to give 2.4 g. (20%) of 1-(3,5-diamino-6-chloropyrazinoyl)-3-phenylguanidinium methanesulfonate, M.P. 272° C. (dec.).

*Analysis.*—Calculated for $C_{12}H_{12}ClN_7O \cdot CH_3SO_3H$: C, 38.85; H, 4.01; N, 24.40. Found: C, 39.05; H, 4.12; N, 24.32.

EXAMPLE 172

*1-(3,5-diamino-6-chloropyrazinoyl)-3-benzylguanidine*

*Step A: Preparation of benzylguanidine hydrochloride.*—A mixture of 80.3 g. (0.75 mole) of benzylamine and 69.5 g. (0.25 mole) of 2-methyl-2-pseudothiuronium sulfate in 200 ml. of water is allowed to stand at room temperature for 18 hours. Methyl mercaptan is evolved and benzylguanidine sulfate separates as a crystalline precipitate. The salt is collected and dried, yielding 78 g. (0.196 mole) of product, M.P. 203–207° C. The salt is dissolved in 200 ml. of boiling water and a saturated aqueous solution of 48.8 g. (0.2 mole) of barium chloride dihydrate is added. The precipitate of barium sulfate is filtered off. The filtrate is evaporated to dryness in vacuo, and the residue, which crystallizes, is recrystallized from aqueous ethanol to give 51.5 g. (55% of theoretical, based on the amount of 2-methyl-2-pseudothiuronium sulfate used) of benzylguanidine hydrochloride, M.P. 175–178° C.

*Analysis.*—Calculated for $C_8H_{11}N_3 \cdot HCl$: N, 22.62. Found: N, 22.45.

*Step B: Preparation of 1-(3,5-diamino-6-chloropyrazinoyl)-3-benzylguanidine.*—Benzylguanidine hydrochloride (9.3 g., 0.05 mole) is added to a solution of sodium (1.0 g., 0.043 g. atom) in 30 ml. isopropyl alcohol. The mixture is concentrated to one-half the original volume by vacuum distillation. Methyl 3,5-diamino-6-chloropyrazinoate (from Example 1, Step B) (2.0 g., 0.01 mole) is added, and the reaction mixture is heated 15 minutes on a steam bath. Approximately 150 ml. of cold water is added whereby the product separates as a gum which quickly solidifies. The product is dissolved in dilute hydrochloric acid and reprecipitated by basification with dilute aqueous sodium hydroxide. After recrystallization from aqueous isopropyl alcohol there is obtained 1.0 g. of 1-(3,5-diamino-6-chloropyrazinoyl)-3-benzylguanidine, M.P. 215–216° C. (dec.).

*Analysis.*—Calculated for $C_{13}H_{14}ClN_7O$: C, 48.83; H, 4.41; N, 30.67. Found: C, 48.89; H, 4.62; N, 30.56.

The method described in Example 172, Step A, can be used to prepare other aralkylguanidine intermediates which then can be reacted with an alkyl 3,5-diamino-6-halopyrazinoate by the method described in Step B of Example 172 to give the 1-(3,5-diamino-6-halopyrazinoyl) 3-aralkylguanidines of this invention. For example, by replacing benzylamine used in Step A of Example 172, by p-fluorobenzylamine, α-methylbenzylamine, 2-naphthylmethylamine, and 3-pyridylmethylamine, and following substantially the same procedure described in Step A of Example 172 there is obtained p-fluorobenzylguanidine hydrochloride, (α-methylbenzyl)guanidine hydrochloride, (2-naphthylmethyl)guanidine hydrochloride, (3-pyridylmethyl)guanidine dihydrochloride. When these guanidines are used in place of the benzylguanidine hydrochloride employed in Step B of Example 172, and the procedure of Step B is followed there is obtained 1 - (3,5 - diamino - 6-chloropyrazinoyl)-3-p-fluorobenzylguanidine, M.P. 216–219.5° C. (dec.).
1-(3,5-diamino-6-chloropyrazinoyl)-3 -(α - methylbenzyl) guanidine, M.P. 153–160° C. (dec.).
1 - (3,5 - diamino - 6 - chloropyrazinoyl) - 3-(2-naphthylmethyl)guanidine, M.P. 243.5–245.5° C. (dec.).
1-(3,5-diamino-6-chloropyrazinoyl)-3-(3 - pyridylmethyl) guanidine, M.P. 280.5–283.5° C. (dec.).

Other aralkylguanidines and other 1-(3,5-diamino-6-halopyrazinoyl)-3-aralkylguanidines prepared by the methods described in Steps A and B of Example 172 are described in Tables III and IV.

The aralkylguanidines identified in Table III are prepared by replacing the benzylamine employed in Step A of Example 172 by an equimolecular quantity of the aralkylamine,

identified in Table III, and reacting said aralkylamine with 2-methyl-2-pseudothiuronium sulfate by substantially the same method described in Step A of Example 172 to give an aralkylguanidine hydrochloride of the formula

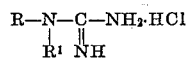

The aralkylguanidine hydrochlorides thus prepared are employed in place of the benzylguanidine hydrochloride used in Step B of Example 172 to make, by substantially the same method described in Step B of Example 172, the novel 1-(3,5-diamino-6-halopyrazinoyl)-3-(aralkyl) guanidines,

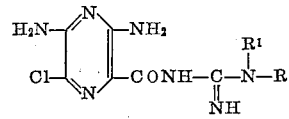

identified in Table IV.

In each table, the radicals R and $R^1$ in the starting materials are retained unchanged in the end products, and are identified in columns 2 and 3 of each table. The yield of each end product is given in each table, and the end products are identified additionally by melting point and elemental analysis. All conditions of reaction are essentially as described in Example 172.

TABLE III—ARALKYLGUANIDINE HYDROCHLORIDES

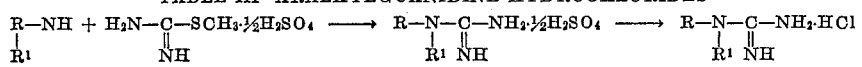

| Ex. No. Step A | R | $R^1$ | Yield, Percent | M.P.,[1] °C. (Corr.) | Formula | Nitrogen, Percent Calcd. | Nitrogen, Percent Found |
|---|---|---|---|---|---|---|---|
| 173 | CH₃—⟨⟩—CH₂— | H— | 28 | 153–155 | $C_9H_{13}N_3 \cdot HCl$ | 21.04 | 20.95 |
| 174 | ⟨⟩—CH₂— | CH₃— | 32 | 122.5–125.5 | $C_9H_{13}N_3 \cdot HCl$ | 21.04 | 20.88 |
| 175 | (Cl)⟨⟩—CH₂— | H— | 71 | 131–136 | $C_8H_{10}ClN_3 \cdot HCl$ | 19.09 | 19.01 |
| 176 | Cl—⟨⟩—CH₂— | H— | 55 | [2] 162.5–164.5 | | | |
| 177 | CH₃O—⟨⟩—CH₂— | H— | 69 | 132–137 | $C_9H_{13}N_3O \cdot HCl$ | 19.48 | 19.20 |
| 178 | CH₃—⟨(CH₃)⟩—CH₂— | H— | 52 | 105–115 | $C_{10}H_{15}N_3 \cdot HCl$ | 19.66 | 19.47 |
| 179 | Cl—⟨(Cl)⟩—CH₂— | H— | 67 | 145–148 | $C_8H_9Cl_2N_3 \cdot HCl$ | 16.51 | 16.37 |
| 180 | Cl—⟨(Cl)⟩—CH₂— | H— | 77 | 153–157 | $C_8H_9Cl_2N_3 \cdot HCl$ | 16.51 | 16.47 |
| 181 | ⟨⟩—CH₂CH₂— | H— | 71 | 135–138 | $C_9H_{13}N_3 \cdot HCl$ | 21.04 | 21.95 |

[1] Compounds are hygroscopic.
[2] S. Saijo, J. Pharm. Soc. Japan 72, 1444 (1952) gives m.p. 156–158°.

TABLE IV.—1-(3,5-DIAMINO-6-CHLOROPYRAZINOYL)-3-(ARALKYL)GUANIDINES $$\underset{Cl}{\overset{H_2N}{\longrightarrow}}\overset{N}{\underset{N}{\bigcirc}}\overset{NH_2}{\underset{CO_2CH_3}{\longrightarrow}} + R-N-\overset{NH}{\underset{R^1}{C}}-NH_2 \longrightarrow \underset{Cl}{\overset{H_2N}{\longrightarrow}}\overset{N}{\underset{N}{\bigcirc}}\overset{NH_2}{\underset{CO-NH-\overset{R^1}{\underset{NH}{C}}-N-R}{\longrightarrow}}$$

| Ex. No. (Step B) | R | R¹ | Form in which isolated | Yield, percent | M.P.,° C. (dec.) | Formula | Carbon Calc. | Carbon Found | Hydrogen Calc. | Hydrogen Found | Nitrogen Calc. | Nitrogen Found |
|---|---|---|---|---|---|---|---|---|---|---|---|---|
| 182 | 4-CH₃-C₆H₄-CH₂- | H- | Free base | 27 | 210-212 | C₁₄H₁₆ClN₇O | 50.37 | 50.34 | 4.83 | 4.76 | 29.38 | 29.07 |
| 183 | C₆H₅-CH₂- | CH₃- | HCl salt | 35 | 274.5 | C₁₄H₁₆ClN₇O·HCl | 45.41 | 45.22 | 4.63 | 4.48 | 26.48 | 26.16 |
| 184 | 2-Cl-C₆H₄-CH₂- | H- | Free base | 39 | 220-223 | C₁₃H₁₃Cl₂N₇O | 44.08 | 44.12 | 3.70 | 3.91 | 27.68 | 27.18 |
| 185 | 4-Cl-C₆H₄-CH₂- | H- | Free base | 46 | 204-206 | C₁₃H₁₃Cl₂N₇O | 44.08 | 44.27 | 3.70 | 3.95 | 27.68 | 27.73 |
| 186 | 4-CH₃O-C₆H₄-CH₂- | H- | Free base | 27 | 175.5-179.5 | C₁₄H₁₆ClN₇O₂ | 48.07 | 48.02 | 4.61 | 4.69 | | |
| 187 | 2,4-(CH₃)₂-C₆H₃-CH₂- | H- | Free base | 59 | 220-222 | C₁₅H₁₈ClN₇O | 51.80 | 52.08 | 5.21 | 5.23 | 28.19 | 27.88 |
| 188 | 2,4-Cl₂-C₆H₃-CH₂- | H- | HCl salt | 30 | 267.5-270.5 | C₁₃H₁₂Cl₃N₇O·HCl | 36.73 | 36.75 | 3.08 | 3.24 | 23.07 | 22.88 |
| 189 | 2,4-Cl₂-C₆H₃-CH₂- | H- | Free base | 47 | 216-219 | C₁₃H₁₂Cl₃N₇O | 40.17 | 39.95 | 3.11 | 3.06 | 25.23 | 24.92 |
| 190 | C₆H₅-CH₂-CH₂- | H- | Free base | 46 | 210-221.5 | C₁₄H₁₆ClN₇O | 50.37 | 50.67 | 4.83 | 4.86 | 29.38 | 29.08 |

The following examples and Table V illustrate the preparation of the 1-pyrazinoyl-3,3-disubstituted guanidines of this invention.

EXAMPLE 191

*1-(3,5-diamino-6-chloropyrazinoyl)-3,3-dimethylguanidine hydrochloride monohydrate*

Step A: Preparation of 1-(3,5-diamino-6-chloropyrazinoyl)-3,3-dimethylguanidine.—A 300 ml. round-bottomed, one-necked flask fitted with a water-cooled condenser, calcium chloride drying tube and a magnetic stirrer is charged with anhydrous methanol (200 ml.) and metallic sodium (2.3 g., 0.10 g. atom). When the reaction is complete, the solution is treated with dimethylguanidine sulfate (15 g., 0.055 mole) and heated at reflux for one hour. The solution is cooled, filtered to remove sodium sulfate, and the filtrate reduced by vacuum distillation to a volume of 30 ml. and added to methyl 3,5-diamino-6-chloropyrazinoate (10.15 g., 0.05 mole). The reaction mixture is heated 30 minutes on a steam bath and kept one hour at room temperature. Subsequent treatment with 200 ml. of water gives 3.6 g. (28%) of 1-(3,5-diamino-6-chloropyrazinoyl) - 3,3 - dimethylguanidine which decomposes slowly from 240° C.

Step B: Preparation of 1-(3,5-diamino-6-chloropyrazinoyl) - 3,3 - dimethylguanidine hydrochloride monohydrate.—The product from Step A is dissolved in a mixture of 75 ml. of hot water and 1.5 ml. of concentrated hydrochloric acid, filtered and cooled to give 3.5 g. of 1-(3,5-diamino-6-chloropyrazinoyl)-3,3-dimethylguanidine hydrochloride monohydrate which melts at 275° C. (dec.) after recrystallization from water containing a trace of hydrochloric acid.

Analysis.—Calculated for $C_8H_{12}ClN_7O \cdot HCl \cdot H_2O$: C, 30.78; H, 4.84; N, 31.41; Cl, 22.72. Found: C, 30.74; H, 5.00; N, 31.41; Cl, 22.88.

EXAMPLE 192

*1-(3,5-diamino-6-chloropyrazinoyl)-3-[2-(octahydro-1-azocinyl)ethyl]guanidine*

By replacing the methyl 3-amino-5-dimethylamino-6-chloropyrazinoate and guanidine employed in Example 79 by equimolar quantities of methyl 3,5-diamino-6-chloropyrazinoate (from Example 1, Step B) and [2-(octahydro-1-azocinyl)ethyl]guanidine sulfate respectively and following the same procedure described in Example 79 (except that heating on the steam bath continues for an hour), there is obtained 1-(3,5-diamino-6-chloropyrazinoyl)-3-[2-(octahydro-1-azocinyl)ethyl]guanidine.

EXAMPLE 193

*1-(3,5-diamino-6-chloropyrazinoyl)-3,3-diethylguanidine*

Step A: Preparation of 1,1-diethylguanidine hydrochloride.—To diethylamine (36.57 g., 0.5 mole) in water (100 ml.) is added concentrated hydrochloric acid (41 ml., 0.5 mole) with cooling. Diethylamine (3.66 g., 0.05 mole) then is added to give a pH of 9.2. This solution is heated to 100° C. and to it is added dropwise over a period of 4 hours a 50% aqueous solution of cyanamide (65.16 g., 0.775 mole). After addition is complete, refluxing is continued for 1 hour and the reaction mixture then is allowed to stand overnight at room temperature. One equivalent of 40% aqueous sodium hydroxide solution (50 ml.) is added and, while cooling, carbon dioxide gas is bubbled through the reaction mixture for 3 hours. The bicarbonate salt which separates is collected by filtration and dissolved in warm water (125 ml.). Treatment with one equivalent of concentrated hydrochloric acid (41 ml.) gives 35 g. (46%) of 1,1-diethylguanidine hydrochloride, M.P. 147–149° C.

Step B: Preparation of 1-(3,5-diamino-6-chloropyrazinoyl)-3,3-diethylguanidine.—By replacing the 1,1-dimethylguanidine sulfate employed in Example 191 by 0.11 mole of 1,1-diethylguanidine hydrochloride, and following substantially the same method described in Example 191, there is obtained an 88.6% yield of 1-(3,5-diamino-6-chloropyrazinoyl)-3,3-diethylguanidine, M.P. 265° C. (dec.).

Analysis.—Calculated for $C_{10}H_{16}ClN_7O$: C, 42.03; H, 5.64; Cl, 12.41; N, 34.32. Found: C, 42.02; H, 5.45; Cl, 12.49; N, 34.14.

EXAMPLE 194

*1 - (3,5-diamino-6-chloropyrazinoyl)-3,3-dibutylguanidine*

Step A: Preparation of 1,1-dibutylguanidine hydrochloride.—By replacing the diethylamine (both occurrences) used in Example 193, Step A, by equimolecular quantities of dibutylamine, and following substantially the same procedure described in Example 193, Step A, there is obtained an 86% yield of 1,1-dibutylguanidine hydrochloride which, after two recrystallizations from water, melts at 104.5–106° C.

Analysis.—Calculated for $C_9H_{21}N_3 \cdot HCl$: C, 52.03; H, 10.67; N, 20.23. Found: C, 52.11; H, 10.20; N, 20.17.

Step B: Preparation of 1-(3,5-diamino-6-chloropyrazinoyl)-3,3-dibutylguanidine.—By replacing the 1,1-dimethylguanidine sulfate employed in Example 191 by 0.11 mole of 1,1-dibutylguanidine hydrochloride and following substantially the same procedure described in Example 191, there is obtained 1-(3,5-diamino-6-chloropyrazinoyl)-3,3-dibutylguanidine which, after two recrystallizations from isopropyl alcohol melts at 148–149° C., yield 72%.

Analysis.—Calculated for $C_{14}H_{24}ClN_7O$: C, 49.19; H, 7.08; Cl, 10.37; N, 28.68. Found: C, 49.01; H, 6.94; Cl, 10.43; N, 28.86.

EXAMPLE 195

*1-(3,5-diamino-6-chloropyrazinoyl)-3,3-tetramethyleneguanidine*

By replacing the 1,1-dimethylguanidine sulfate employed in Example 191 by an equimolar quantity of 1-amidinopyrrolidine nitrate and following substantially the same procedure described in Example 191, there is obtained 1-(3,5-diamino-6-chloropyrazinoyl)-3,3-tetramethyleneguanidine.

EXAMPLE 196

*1-(3,5-diamino-6-chloropyrazinoyl)-3,3-(3-oxapentamethylene)guanidine*

By replacing the 1,1-dimethylguanidine sulfate employed in Example 191 by an equimolar quantity of 4-amidinomorpholine hydrochloride and following substantially the same procedure described in Example 191 there is obtained 1-(3,5-diamino-6-chloropyrazinoyl)-3,3-(3-oxapentamethylene)guanidine.

EXAMPLE 197

*1-(3,5-diamino-6-chloropyrazinoyl)-2,3-dimethylguanidine*

By replacing the 1,1-dimethylguanidine sulfate employed in Example 191 by an equimolar quantity of 1,2-dimethylguanidine hydriodide and following substantially the same procedure described in Example 191, there is obtained 1-(3,5-diamino-6-chloropyrazinoyl) - 2,3 - dimethylguanidine.

Other 1 - (3,5-diamino-6-chloropyrazinoyl) - 3,3 - dimethylguanidines that can be prepared by substantially the same method described in Example 191 are identified in Table V. In each instance the methyl 3,5-diamino-6- chloropyrazinoate employed in Example 191 is replaced by an alkylpyrazinoate having the structure

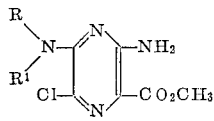

which is reacted with 1,1-dimethylguanidine by essentially the same method described in Example 191 to give a pyrazinoylguanidine having the structure

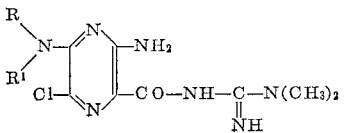

The radicals R and R¹ in the starting alkyl pyrazinoate in each case are retained in the pyrazinoylguanidine end product and are identified in columns 2 and 3 of Table V. While the alkyl pyrazinoate and guanidine reactants are employed in the same molar ratio used in Example 191, this ratio is not critical and more or less of either reactant can be employed. The reagents, time of heating on the steam bath, crystallization solvent, melting point and elementary analysis of each product are given in Table V. All other conditions of reaction essentially are as described in Example 191.

The novel compounds of this invention can be compounded in the usual oral or parenteral dosage forms for use in therapy in the treatment of conditions resulting from an abnormal electrolyte excretion pattern of an animal organism. It will be appreciated that the dosage of each individual compound will vary over a wide range depending upon the relative potency of the selected compound and also depending upon the age and weight of the particular patient to be treated and upon the particular ailment to be treated. For these reasons, tablets, pills, capsules and the like containing for example from 5 to 750 mg. or more or less active ingredient can be made available for the symptomatic adjustment of the dosage to the individual patient. As each of the compounds of this invention can be incorporated in a dosage form similar to those described in the following examples, or other usual dosage form suitable for oral or parenteral administration, which can be prepared by well known methods, only a few examples are included herein to illustrate the preparation of representative dosage forms.

TABLE V

| Ex. No. | R | R¹ | Pyrazinoate from Ex. No. | Min. on Steam Bath | Crystallization Solvent | Yield, Percent | M.P. °C. | Empirical Formula | End Product Analysis | | | | |
|---|---|---|---|---|---|---|---|---|---|---|---|---|---|
| | | | | | | | | | | C | H | N | Cl |
| 198 | $(CH_3)_2CH$ | H | 37 | 10 | 2-propanol | 35 | 238.5–240.0 | $C_{11}H_{18}ClN_7O$ | Calc. | 44.07 | 6.05 | 32.70 | 11.83 |
| | | | | | | | | | Found | 44.35 | 6.04 | 32.62 | 11.67 |
| 199 | $CH_2=CHCH_2$ | H | 38 | 5 | 2-propanol | 39 | 213–215 | $C_{11}H_{16}ClN_7O$ | Calc. | 44.37 | 5.42 | 32.93 | 11.91 |
| | | | | | | | | | Found | 44.50 | 5.25 | 32.76 | 11.85 |
| 200 | $CH_3(CH_2)_3$ | H | 39 | 240 | 2-propanol | 17 | 187.5 | $C_{12}H_{20}ClN_7O$ | Calc. | 45.93 | 6.42 | 31.25 | 11.30 |
| | | | | | | | | | Found | 45.95 | 6.50 | 30.81 | |
| 201 | cyclopropyl-CH₂ | H | 47 | 45 | 2-propanol | 3 | 196–197 | $C_{11}H_{18}ClN_7O$ | Calc. | 46.22 | 5.82 | 31.45 | |
| | | | | | | | | | Found | 46.40 | 6.14 | 31.34 | |
| 202 | $CH_3$ | $CH_3$ | 6 | 5 | Methanol | 69 | 219 | $C_{10}H_{16}ClN_7O$ | Calc. | 42.03 | 5.64 | 34.32 | 12.41 |
| | | | | | | | | | Found | 41.97 | 5.63 | 34.13 | 12.26 |
| 203 | $CH_3$ | $C_2H_5$ | 63 | 5 | Ethanol | 49 | 217–218 | $C_{11}H_{18}ClN_7O$ | Calc. | 44.07 | 6.05 | 32.70 | 11.83 |
| | | | | | | | | | Found | 44.17 | 5.81 | 32.73 | 11.86 |
| 204 | $CH_3$ | $(CH_3)_2CH$ | 65 | 5 | 2-propanol | 61 | 209–211 | $C_{12}H_{20}ClN_7O$ | Calc. | 45.93 | 6.42 | 31.25 | 11.30 |
| | | | | | | | | | Found | 45.88 | 6.36 | 31.06 | 11.30 |
| 205 | $C_2H_5$ | $C_2H_5$ | 68 | 5 | Ethanol | 40 | 212–214 | $C_{12}H_{20}ClN_7O$ | Calc. | 45.93 | 6.42 | 31.25 | 11.30 |
| | | | | | | | | | Found | 46.03 | 6.11 | 31.14 | 11.35 |

EXAMPLE 206

*Compressed tablet containing 50 mg. of active ingredient*

| | Per tablet, mg. |
|---|---|
| 1-(3,5-diamino-6-chloropyrazinoyl) - 3-benzylguanidine hydrochloride | 50 |
| Calcium phosphate dibasic | 200 |
| Ethyl cellulose (as 5% solution in ethanol) | 5 |
| Unmixed granulation | 255 |
| Add: | |
| Starch, corn | 14 |
| Magnesium stearate | 1 |
| | 270 |

Directions: Mix the 1-(3,5-diamino-6-chloropyrazinoyl)-3-benzylguadidine hydrochloride, from Example 172, and calcium phosphate and reduce to a No. 60 mesh powder. Granulate with Ethocel in alcohol and pass the wet granulation through a No. 10 screen. Dry the granulation at 110° F. for 12–18 hours. Dry grind to a No. 20 mesh. Incorporate the "adds" and compress into tablets each weighing 270 mg.

EXAMPLE 207

*Dry filled capsule containing 50 mg. of active ingredient*

| | Per capsule, mg. |
|---|---|
| (3,5-diamino-6-chloropyrazinoyl)-guanidine hydrochloride | 50 |
| Lactose | 273 |
| Magnesium stearate | 2 |
| Mixed powders | 325 |

Mix the (3,5-diamino-6-chloropyrazinoyl)-guanidine hydrochloride, from Example 89, lactose, and magnesium stearate and reduce to a No. 60 mesh powder. Encapsulate, filling 325 mg. in each No. 2 capsule.

The above formulations can be employed to prepare compressed tablets or capsules of other novel compounds of this invention hereinbefore described.

It is also contemplated to combine compounds of this invention in unit dosage form with other known diuretic agents, such as, hydrochlorothiazide, 4'-methyl-6-chlorospiro - [2H - 1,2,4 - benzothiadiazide - 3(4H) - 1' - cyclohexane]-7-sulfonamide-1,1 - dioxide, trichloromethiazide, cyclopenthiazide, acetazolamide, dichlorphenamide, chlorthalidone, chlormerodrin, chlorazinil or spironolactone. One example of such a combination is presented below:

EXAMPLE 208

*Combination dosage form in dry filled capsule*

| | Per capsule, mg. |
|---|---|
| (3 - amino - 5 - isopropylamino - 6 - chloropyrazinoyl) - 3,3 - dimethylguanidine hydrochloride (from Example 198) | 50 |
| Hydrochlorothiazide | 50 |
| Magnesium stearate | 2 |
| Lactose | 223 |
| Mixed powders | 325 |

Mix all of the above ingredients, reduce to a No. 60 mesh powder and encapsulate, filling 325 mg. in each No. 2 capsule.

It is further contemplated to combine compounds of this invention with hypotensive agents, or steroids or other desired therapeutic agents in suitable dosage form.

While the above examples describe the preparation of certain compounds which are illustrative of the novel compounds of this invention, and certain specific dosage forms suitable for administering the novel compounds, it is to be understood that the invention is not to be limited to the specific compounds described in the examples or by the specific reaction conditions described for the preparation of these compounds or by the specific ingredients included in the pharmaceutical preparations, but is to be understood to embrace variations and modifications thereof which fall within the scope of the appended claims.

What is claimed is:

1. A compound selected from the group consisting of a product having the structural formula

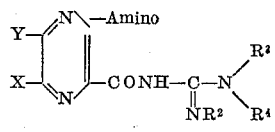

and pharmaceutically acceptable salts thereof wherein

X is selected from the group consisting of chlorine, bromine and iodine, lower-alkyl, lower-cycloalkyl having from 3 to 7 carbons, phenyl, chloro-phenyl, bromine-phenyl, Z-thio and Z-sulfonyl wherein Z is selected from the group consisting of lower alkyl and phenyl-lower alkyl;

Y is selected from the group consisting of hydroxyl, mercapto, lower-alkoxy, lower-alkylthio, chloro, lower-alkyl, lower-cycloalkyl having from 3 to 6 carbons, phenyl, amino having the structure

wherein

R is selected from the group consisting of hydrogen, amino, amidino, lower-cycloalkyl having 3 to 6 carbon atoms, lower-alkyl, hydroxy-lower alkyl, halo-lower-alkyl, lower-(cycloalkylalkyl) having 3 to 6 carbons in the ring, phenyl-lower-alkyl, lower-(alkylphenalkyl), halophenyl - lower - alkyl, furyl - lower - alkyl, pyridyl-lower-alkyl, lower-(alkylaminoalkyl), lower-alkenyl, phenyl, halophenyl, and lower-alkylphenyl;

$R^1$ is selected from the group consisting of hydrogen, lower-alkyl, lower-alkenyl, and additionally R and $R^1$ can be joined to form a lower alkylene;

$R^2$ is selected from the group consisting of hydrogen, and lower-alkyl;

$R^3$ and $R^4$ respectively is selected from the group consisting of hydrogen, lower-alkyl, hydroxy-lower-alkyl, phenyl-lower-alkyl, (halo-phenyl)-lower-alkyl, lower-(alkylphenalkyl), (lower - alkoxyphenyl) - lower-alkyl, naphthyl - lower - alkyl, (octahydro-1-azocinyl)-lower-alkyl, pyridyl-lower-alkyl, and lower-alkyl radicals linked to produce with the nitrogen atom to which they are attached a 1-pyrrolidinyl, piperidino, morpholino, and a 4-lower-alkyl-piperazinyl group, and phenyl.

2. A compound having the structure

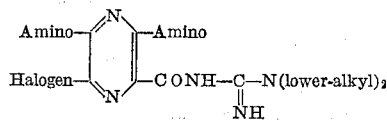

wherein the 6-position halogen is selected from chlorine, bromine and iodine.

3. 1 - (3,5 - diamino - 6-chloropyrazinoyl)-3,3-diethylguanidine.

4. A compound having the structure

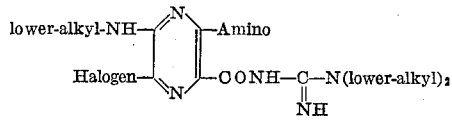

wherein the 6-position halogen is selected from chlorine, bromine and iodine.

5. A compound having the structure

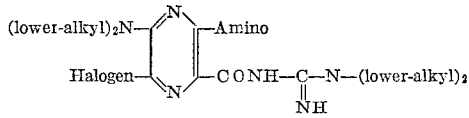

wherein the 6-position halogen is selected from chlorine, bromine and iodine.

6. 1 - (3-amino-5-isopropylamino-6-chloropyrazinoyl)-3,3-dimethylguanidine.

7. A compound having the structure

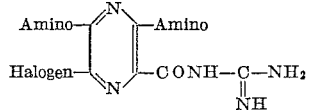

wherein the 6-position halogen is selected from chlorine, bromine and iodine.

8. A compound having the structure

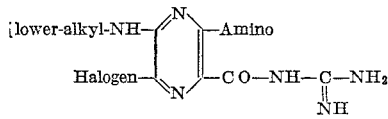

wherein the 6-position halogen is selected from chlorine, bromine and iodine.

9. A compound having the structure

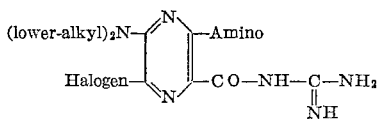

wherein the 6-position halogen is selected from chlorine, bromine and iodine.

10. A compound having the structure

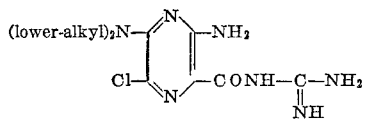

11. (3,5-diamino-6-chloropyrazinoyl)guanidine.
12. (3-amino-5-isopropylamino-6-chloropyrazinoyl)-guanidine.
13. (3-amino-5-dimethylamino-6-chloropyrazinoyl)-guanidine.
14. A compound having the structure

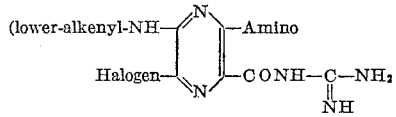

wherein the 6-position halogen is selected from chlorine, bromine and iodine.

15. (3-amino-5-allylamino-6-chloropyrazinoyl)-guanidine.

16. A compound having the structure

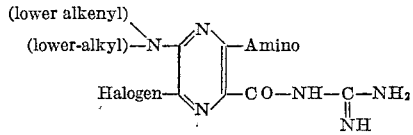

wherein the 6-position halogen is selected from chlorine, bromine and iodine.

17. [3-amino-5-(N-methyl-N-allylamino)-6-chloropyrazinoyl]guanidine.

18. A compound having the structure

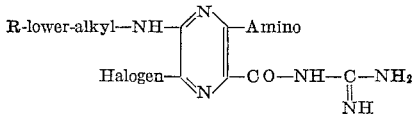

wherein R is a lower-cycloalkyl group having 3 to 6 carbons, and the 6-position halogen is selected from chlorine, bromine and iodine.

19. [3-amino-5-(cyclopropylmethylamino)-6-chloropyrazinoyl]guanidine.

20. A compound having the structure

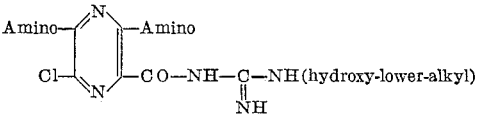

21. 1-(3,5-diamino-6-chloropyrazinoyl)-3-(2-hydroxyethyl)guanidine.

22. A compound having the structure

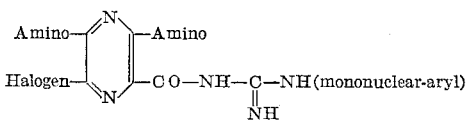

wherein the 6-position halogen is selected from chlorine, bromine and iodine.

23. 1-(3,5-diamino-6-chloropyrazinoyl)-3-phenylguanidine.

24. A compound having the structure

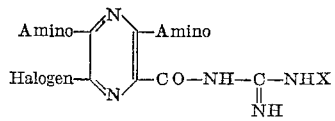

wherein X is phenyl-lower alkyl, and the 6-position halogen is selected from chlorine, bromine and iodine.

25. 1-(3,5-diamino-6-chloropyrazinoyl)-3-benzylguanidine.

26. (3-amino-5-lower-alkoxy-6-halopyrazinoyl)-guanidine wherein the 6-halo substituent is selected from chloro, bromo and iodo.

27. (3-amino-5-methoxy-6-chloropyrazinoyl)-guanidine.

28. (3-amino-5-lower-alkyl-6-halopyrazinoyl)-guanidine wherein the 6-halo substituent is selected from chloro, bromo and iodo.

29. (3-amino-5-methyl-6-bromopyrazinoyl)guanidine.
30. (3,5-diamino-6-lower-alkylpyrazinoyl)guanidine.
31. (3-amino-2-quinoxalinecarbonyl)guanidine.

No references cited.

NICHOLAS S. RIZZO, *Primary Examiner.*